(12) United States Patent
Koike

(10) Patent No.: US 8,351,681 B2
(45) Date of Patent: Jan. 8, 2013

(54) STRUCTURE FOR RECOGNIZING ARTICLE TO BE COLLECTED, AND COLLECTION INFORMATION RECOGNITION APPARATUS AND COLLECTION PROCESSING APPARATUS THAT USE THE STRUCTURE

(75) Inventor: Naoki Koike, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 255 days.

(21) Appl. No.: 12/913,439

(22) Filed: Oct. 27, 2010

(65) Prior Publication Data

US 2011/0235852 A1 Sep. 29, 2011

(30) Foreign Application Priority Data

Mar. 29, 2010 (JP) ................................ P2010-076226

(51) Int. Cl.
*G06K 9/00* (2006.01)
*G01C 3/08* (2006.01)
(52) U.S. Cl. ...................... 382/141; 382/274; 356/4.1
(58) Field of Classification Search .................. 382/10, 382/106–108, 140–143, 154, 162, 168, 173, 382/181, 191–199, 209, 219–224, 232, 254, 382/274, 276, 285–291, 305, 312, 321; 348/86; 700/245; 347/242; 356/498, 615, 4.1
See application file for complete search history.

(56) References Cited

U.S. PATENT DOCUMENTS

| | | | | |
|---|---|---|---|---|
| 5,640,241 A | * | 6/1997 | Ogawa | 356/615 |
| 6,985,236 B2 | * | 1/2006 | Seko et al. | 356/498 |
| 7,061,518 B2 | * | 6/2006 | Ueda et al. | 347/242 |
| 2003/0078694 A1 | * | 4/2003 | Watanabe et al. | 700/245 |
| 2005/0102060 A1 | * | 5/2005 | Watanabe et al. | 700/245 |
| 2010/0245558 A1 | * | 9/2010 | Koike et al. | 348/86 |

FOREIGN PATENT DOCUMENTS

JP 2005-055244 3/2005

* cited by examiner

*Primary Examiner* — Seyed Azarian
(74) *Attorney, Agent, or Firm* — Sughrue Mion, PLLC

(57) ABSTRACT

A structure for recognizing an article to be collected includes a recognition reference plane that is provided in a part of a holding base which holds the article to be collected with a predetermined positional relationship and that serves as a reference used for recognizing layout information about a position and an attitude of the holding base. The structure also includes a recognition indicator element which is placed on the recognition reference plane in such a way that an imaging tool captures an image of the recognition indicator element and which has four or more unit pattern marks at a predetermined positional relationship, in which each of the unit pattern marks is formed such that a density pattern sequentially changes with an increasing distance from a center position toward a periphery of the mark.

11 Claims, 27 Drawing Sheets

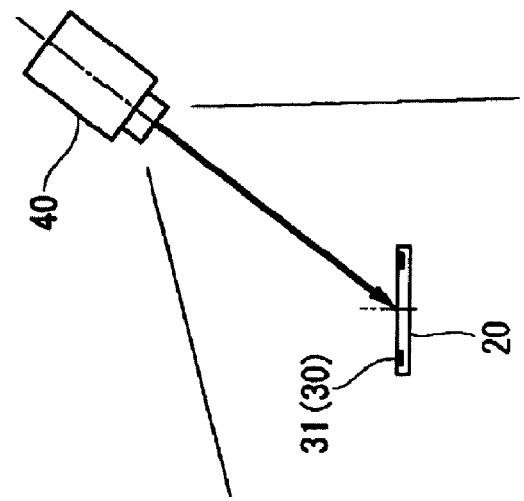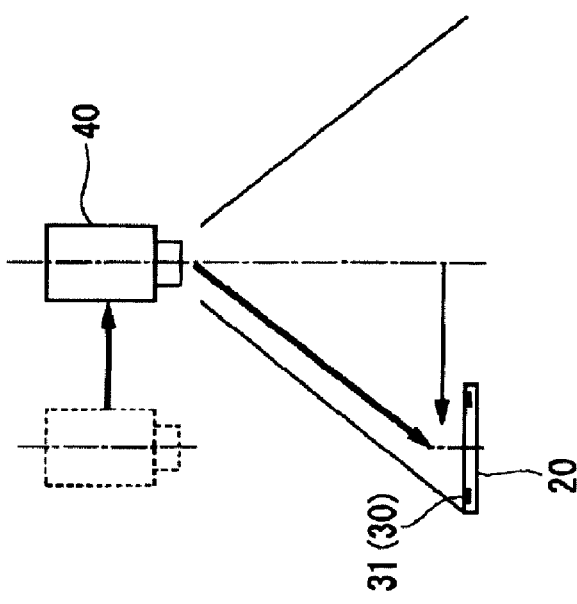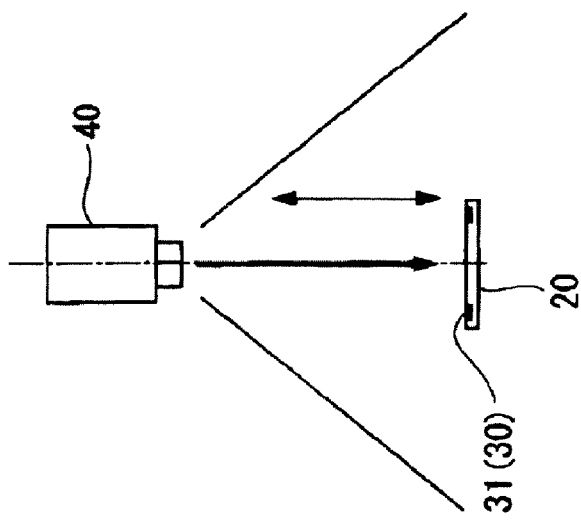

POSITION OF IMAGE

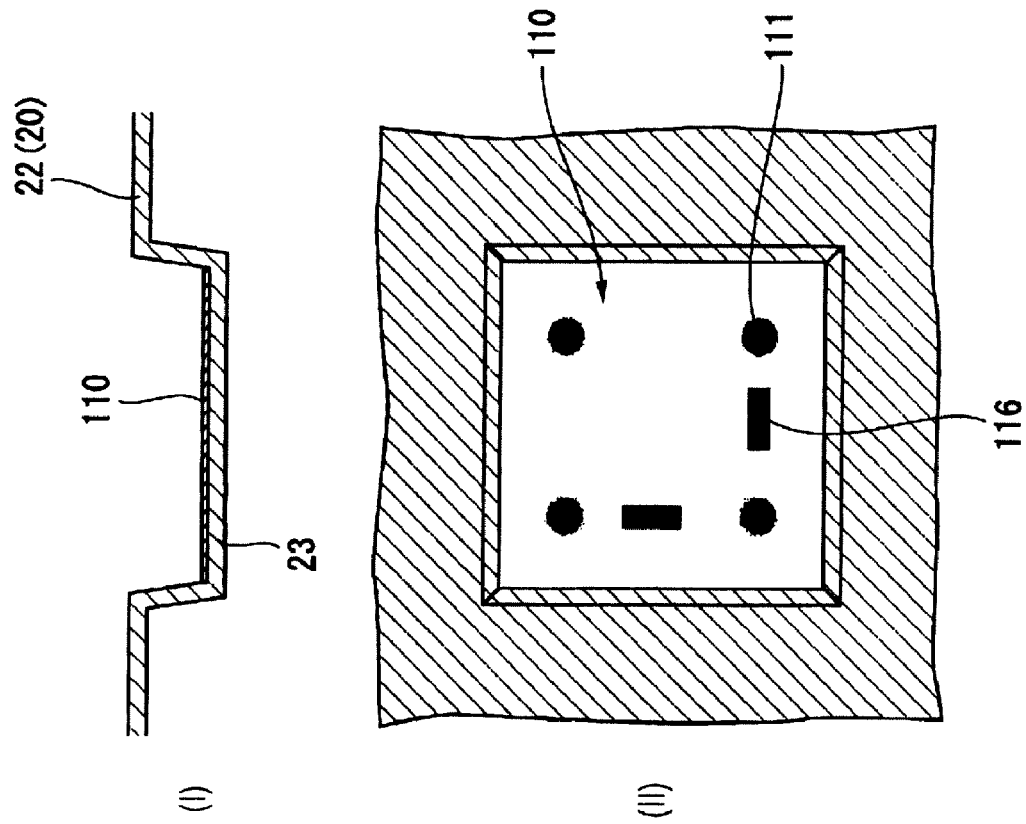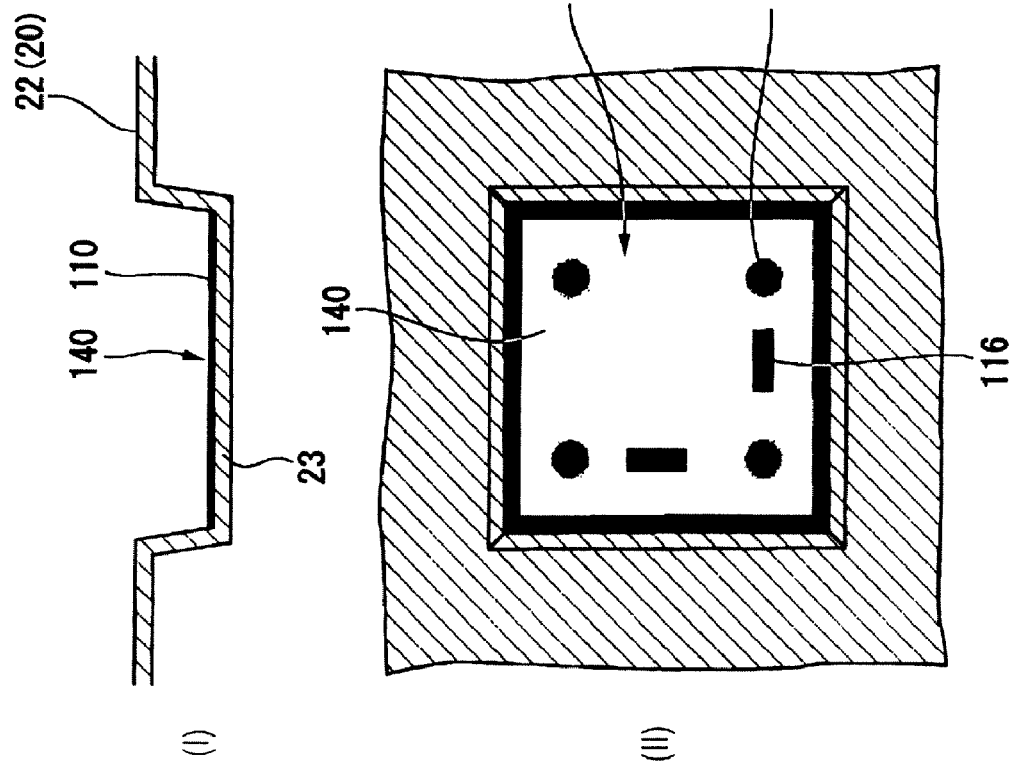

COMPLETION OF TAKE-OUT OF WORKPIECE
(OCCURRENCE OF EMPTY TRAY)

151: FILLED TRAY STORAGE SPACE  152: EMPTY TRAY STORAGE SPACE

MEASURE LAYOUT OF EMPTY TRAY

151: FILLED TRAY STORAGE SPACE  152: EMPTY TRAY STORAGE SPACE

GRIP EMPTY TRAY

151: FILLED TRAY STORAGE SPACE    152: EMPTY TRAY STORAGE SPACE

MOVE EMPTY TRAY TO EMPTY TRAY STORAGE SPACE

151: FILLED TRAY STORAGE SPACE    152: EMPTY TRAY STORAGE SPACE

MEASURE LAYOUT OF EMPTY TRAY STORAGE SPACE

PILE UP EMPTY TRAY

DOT PATTERN

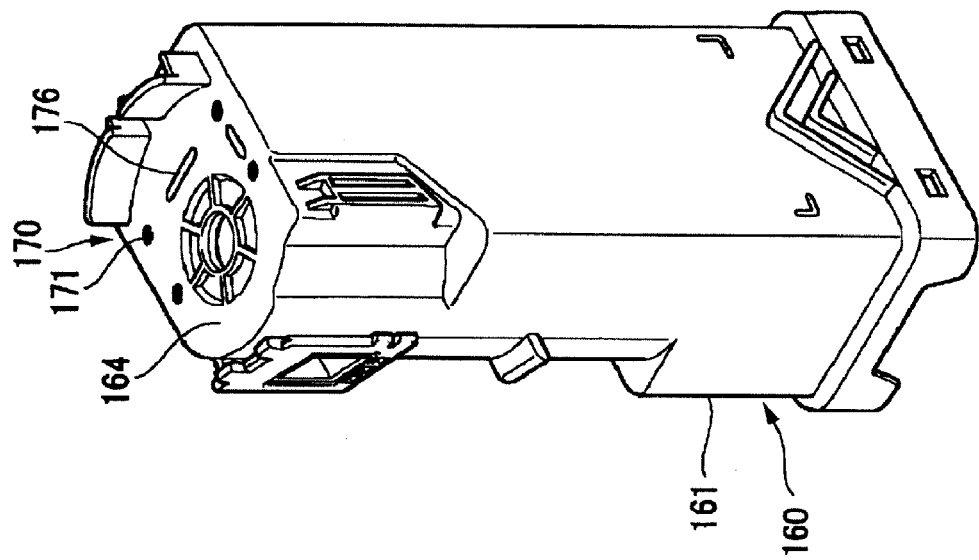
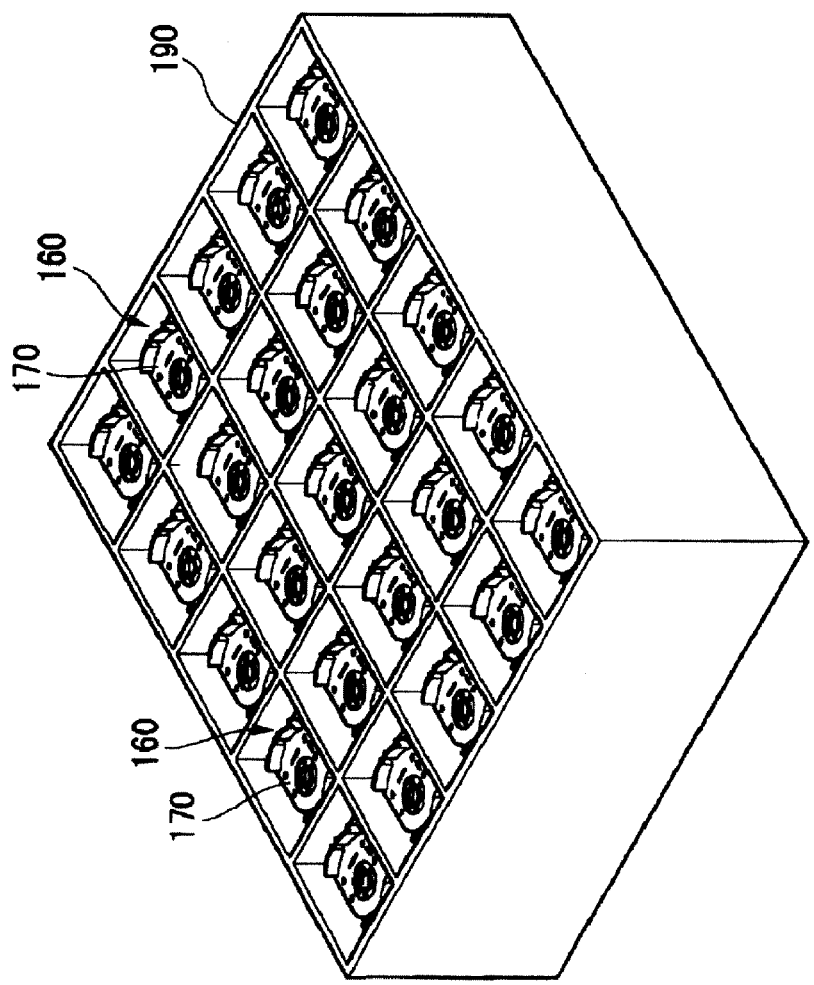
FIG. 26B
FIG. 26A

MEASURE POSITION AND ATTITUDE OF TRAY ON FIRST STAGE

MOVE CAMERA TO HIGH ACCURACY MEASUREMENT ENABLE POSITION

MEASURE POSITION AND ATTITUDE OF TRAY ON SECOND STAGE

GRIP COMPONENT

STRUCTURE FOR RECOGNIZING ARTICLE TO BE COLLECTED, AND COLLECTION INFORMATION RECOGNITION APPARATUS AND COLLECTION PROCESSING APPARATUS THAT USE THE STRUCTURE

CROSS-REFERENCE TO RELATED APPLICATION

This application is based on and claims priority under 35 USC 119 from Japanese Patent Application No. 2010-076226 filed on Mar. 29, 2010.

BACKGROUND

1. Technical Field

The present invention relates to a structure for recognizing an article to be collected as well as to a collection information recognition apparatus and a collection processing apparatus that use the structure.

2. Summary

A structure for recognizing an article to be collected, wherein the structure is recognized by capturing a position and an attitude of the article to be recognized by an imaging tool, comprising:

a recognition indicator plane that is included in the article to be recognized and that has four or more unit pattern marks at a predetermined positional relationship, in which each of the unit pattern marks is formed such that a density pattern sequentially changes with an increasing distance from a center position toward a periphery of the mark, wherein the position and the attitude of the article to be recognized are recognized by capturing the recognition indicator plane by the imaging tool.

BRIEF DESCRIPTION OF THE DRAWINGS

Exemplary embodiments of the invention will be described in detail based on the following figures, wherein:

FIG. 8A is a descriptive view showing a configuration in which an imaging plane of a camera serving as an imaging tool is set at a face-up measurement position with respect to a point of center origin of the pattern marker, FIG. 8B is a descriptive view showing a configuration in which the imaging plane of the camera serving as an imaging tool is moved in parallel to the face-up measurement position shown in FIG. 8A, and FIG. 8C is a descriptive view showing a configuration in which the imaging plane of the camera serving as an imaging tool is placed at a non-face-up measurement position that is not parallel to an indication surface of the pattern marker;

FIGS. 16A and 16B are descriptive views showing another example fixing of the pattern markers employed in the third exemplary embodiment, wherein (I) they are cross sectional descriptive views of the respective pattern markers and (II) they are planar descriptive views of the respective pattern markers;

FIG. 26A is a descriptive view showing a housing container that houses plural of toner cartridges, and FIG. 26B is a descriptive view showing an example structure for recognizing the toner cartridges housed in the housing container; and FIG. 27 shows a collection processing apparatus of a sixth exemplary embodiment, wherein

DETAILED DESCRIPTION

Overview of Modes of Implementation

Figure 1A:
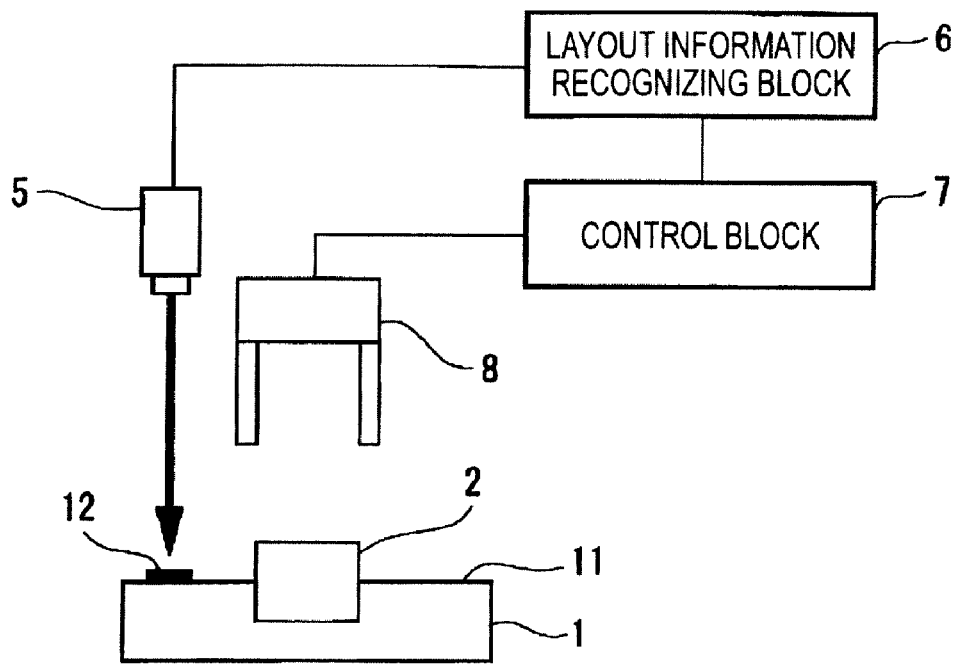
FIG. 1A is a descriptive view showing an overview of an exemplary embodiment of a structure for recognizing an article to be collected to which the present invention applies and an overview of an exemplary embodiment of a collection information recognition apparatus and a collection processing apparatus that use the structure.
Figure 1B:
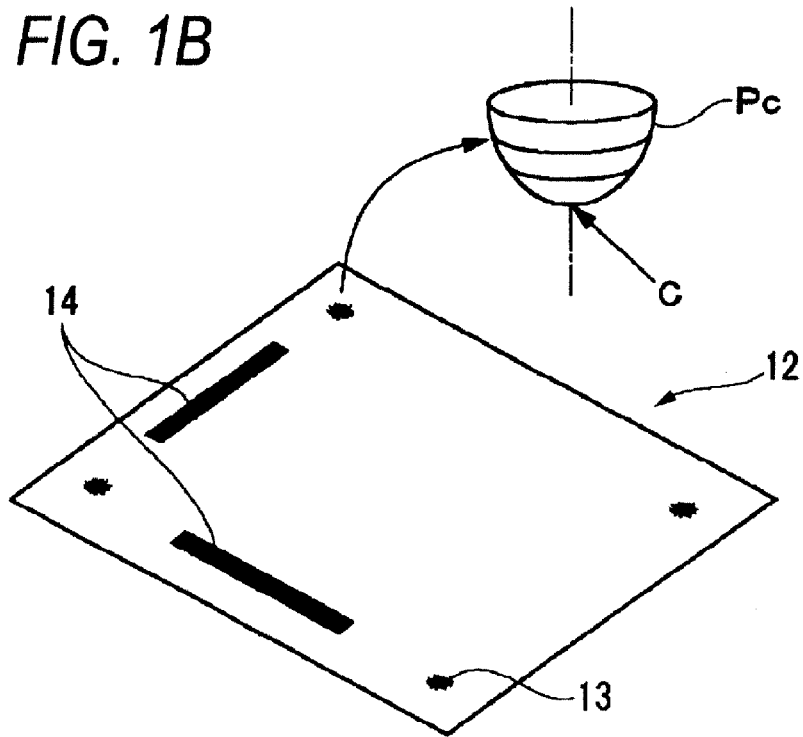
FIG. 1B is a descriptive view showing an example recognition indicator element used in the exemplary embodiment.

In relation to modes of implementation, as shown in FIGS. 1A and 1B, a typical configuration of a structure for verifying an article to be collected includes: a recognition reference plane 11 that is provided in a part of a holding base 1 which holds an article 2 to be collected (a collection target article) in a predetermined position relationship and that serves as a reference for recognizing layout information about a position and an attitude of the holding base 1; and a recognition indicator element 12 which is placed on the recognition reference plane 11 in such a way that an imaging tool 5 may capture an image of the recognition indicator element and which has four or more unit pattern marks 13 at a predetermined positional relationship, in which each of the unit pattern marks is formed such that a density pattern Pc sequentially changes with an increasing distance from a center position C toward a periphery of the mark.

The present configuration corresponds to addition of the recognition reference plane 11 and the recognition indicator element 12 to the holding base 1 for the collection target article 2. Layout information about the collection target article 2 is indirectly recognized from the layout information about the holding base 1.

In connection with such technical means, any element is acceptable as the recognition indicator element 12, so long as the element includes four or more unit pattern marks. In the case of three unit pattern marks, plural of three-dimensional positions may exist in relation to an attitude, which arouses apprehension that the three-dimensional positions may not be specified.

Any mark is used as the unit pattern mark 13, so long as the density pattern Pc sequentially changes. The unit pattern mark is not limited to a configuration in which a center position C exhibits a higher density than that achieved at a periphery of the pattern mark. The unit pattern mark also includes a configuration in which the center position C exhibits a lower density than does the periphery of the pattern mark. A technique for displaying a change in the density pattern Pc of the unit pattern mark 13 with a gradation is also mentioned. However, displaying of the change in density pattern is not limited to a gradation. It is also possible to display the change in the form of dot images (dots).

Further, the imaging tool 5 may be used in numbers. However, in view of simplification of an apparatus configuration, one imaging tool is preferable.

As shown in FIGS. 1A and 1B, another typical configuration of the structure that recognizes an article to be collected includes: the recognition reference plane 11 that is provided in a portion of the collection target article 2 and that serves as a reference for recognizing layout information about a position and an attitude of the collection target article 2; and the recognition indicator element 12 which is provided on the recognition reference plane 11 in such a way that the imaging tool 5 can capture an image of the recognition indicator element and which has four or more unit pattern marks 13 with a predetermined positional relationship, each of which is formed such that the density pattern Pc sequentially changes with an increasing distance from the center position C toward the periphery of the mark.

This configuration corresponds to an addition of the recognition reference plane 11 and the recognition indicator element 12 to the collection target article 2, and layout information about the collection target article 2 is directly recognized.

These structures for recognizing the collection target article 2 are common or closely relevant to each other in terms of technical significance.

A preferred configuration of the recognition indicator element 12 is now described.

First, a preferred configuration of the recognition indicator element 12 is to indicate a change in density pattern Pc of each of the unit pattern marks 13 in the form of a dot image. Since a dot image indication is employed in the present configuration, an inkjet or electrophotographic image forming apparatus may create the unit pattern mark 13 of the recognition indicator element 12.

Another configuration of the recognition indicator element 12 is to place four unit pattern marks 13 on a single plane of an article to be recognized (a recognition target article). It is possible to identify a position and an attitude of the recognition target article; for instance, without making one of the four unit pattern marks 13 in the form of a plane unlike the other three patterns.

Moreover, from the viewpoint of easy change of the recognition indicator element 12, all you need to do is to configure the recognition indicator element so as to be provided on a card that is removably attached to the recognition target article.

Furthermore, when there are recognition target articles of different types, it is better to provide the recognition indicator element 12 with four unit pattern marks 13 or more and type indication marks 14 used for recognizing type information other than the layout information about the position and the attitude of the recognition target article, as shown in FIG. 1B.

In the present exemplary embodiment, the structure for recognizing the collection target article 2 is utilized, whereby the collection information recognition apparatus is constructed.

As shown in FIGS. 1A and 1B, the collection information recognition apparatus has the recognition indicator element 12 that is provided in a portion of the holding base 1 for holding the collection target article 2 with a predetermined positional relationship or a portion of the collection target article 2 and that has four unit pattern marks 13 or more, with a predetermined positional relationship, formed in such a way that the density pattern Pc sequentially changes with an increasing distance from the center position C toward the periphery of the mark. The collection information recognition apparatus also has the imaging tool 5 that is disposed opposite the holding base 1 or the collection target article 2 and that captures an image of the recognition indicator element 12 and a layout information recognition block 6 that uses at least imaging information about the recognition indicator element 12 whose image has been captured by the imaging tool 5 and that recognizes the layout information about the position and the attitude of the holding base 1 or the position and the attitude of the recognition target article made up of the collection target article 2.

In such technical means, a measurement position for the imaging tool 5 may arbitrarily be set. However, in order to enhance measurement accuracy, it is possible to place the imaging tool 5 at a non-face-up measurement position at which an imaging plane of the imaging tool 5 does not face up the surface of the recognition indicator element 12 provided on the recognition target article existing in a view field range of the imaging tool. In this case, there may also be adopted a configuration in which the imaging tool 5 is stationarily provided at the non-face-up measurement position. However, there may also be adopted another configuration for movably supporting the imaging tool 5 so as to be able to effect measurement at the face-up measurement position and the non-face-up measurement position. Alternatively, there may also be adopted a configuration in which the imaging tool 5 is movably supported so as to be able to effect measurement at the non-face-up measurement position in plural of steps.

The layout information recognition block 6 may adopt any recognition technique, so long as the technique is based on an algorithm for recognizing layout information about the position and the attitude of the recognition target article (the holding base 1 or the collection target article 2).

Moreover, so long as the collection information recognition apparatus is adopted, the collection processing apparatus is constructed.

The collection processing apparatus includes: the foregoing collection information recognition apparatus; the control block 7 that generates a control signal from layout information about the position and the attitude of a recognition target article made up of the holding base 1 or the collection target article 2 recognized by the collection information recognition apparatus and that controls operation for collecting the collection target article 2; and the processing mechanism 8 that performs operation for collecting the collection target article 2 in accordance with the control signal generated by the control block 7.

In relation to such technical means, "collection processing" broadly encompasses collection processing, such as simple gripping of the collection target article 2, recovery of the collection target article 2, and disposal of the collection target article 2.

The processing mechanism 8 designates a manipulator; for instance, a robot hand or the like.

Moreover, a configuration adopting a mechanism in which the processing mechanism 8 doubles also as a mechanism for supporting the imaging tool 5 is mentioned as a preferred mechanism for supporting the imaging tool 5.

The present invention is hereunder described in more detail by reference to the configuration of the exemplary embodiment shown in the accompanying drawings.

First Exemplary Embodiment

Figure 2:
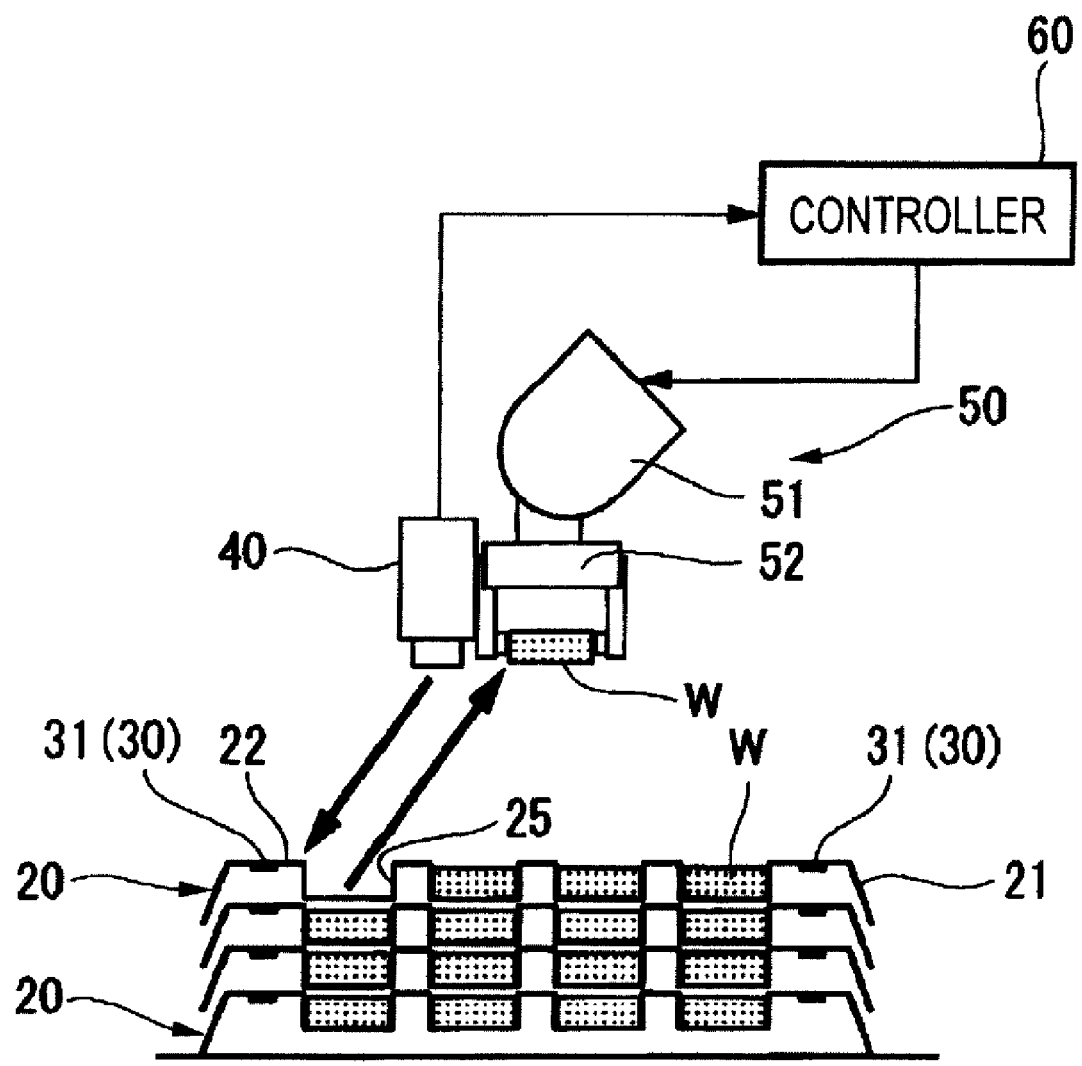
FIG. 2 is a descriptive view showing an overall structure of the collection processing apparatus of the first exemplary embodiment.

FIG. 2 is a descriptive view showing an overall structure of a collection processing apparatus of a first exemplary embodiment.

<Overall Structure of the Collection Processing Apparatus>

In FIG. 2, the collection processing apparatus is for sequentially collecting workpieces W that are collection target articles aligned on a sorting tray 20 and moving the workpieces to a predetermined area.

Figure 10:
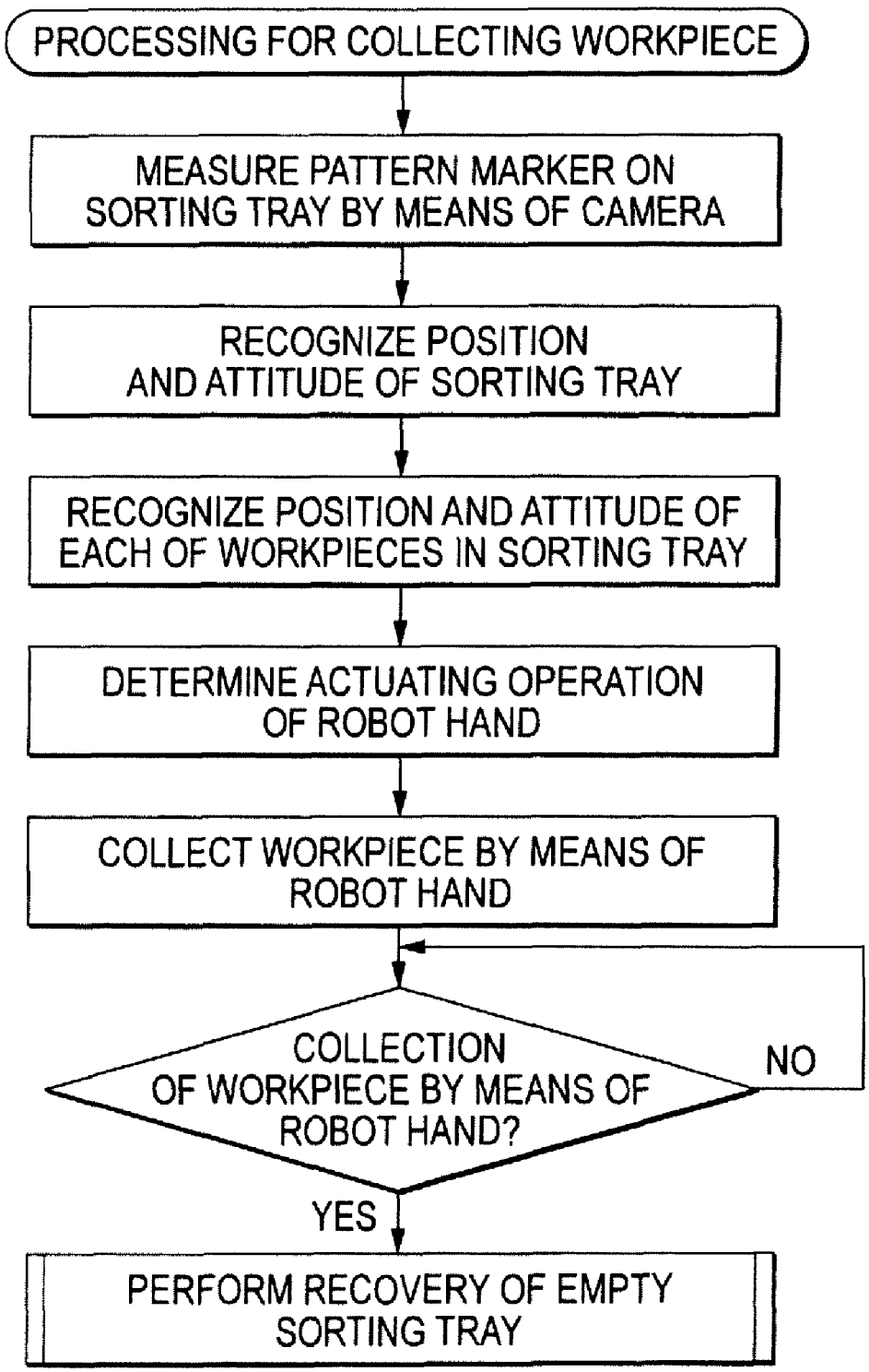
FIG. 10 is a flowchart showing a workpiece collection processing process of the collection processing apparatus of the first exemplary embodiment.

In the present exemplary embodiment, the collection processing apparatus includes: a pattern marker 30 serving as a recognition indicator element provided for recognizing layout information about the position and the attitude of the sorting tray 20; a camera 40 that captures an image of the pattern marker on the sorting tray 20; a robot 50 that collects a workpiece W on the sorting tray 20 and moves the workpiece to a predetermined area; and a controller 60 that controls imaging timing of the camera 40, is provided with an input of imaging information from the camera 40, thereby recognizing layout information about the position and the attitude of the sorting tray 20, and controls motion of the robot 50 on the basis of the layout information and along a flowchart shown in FIG. 10 which will be described later.

Figure 3A:
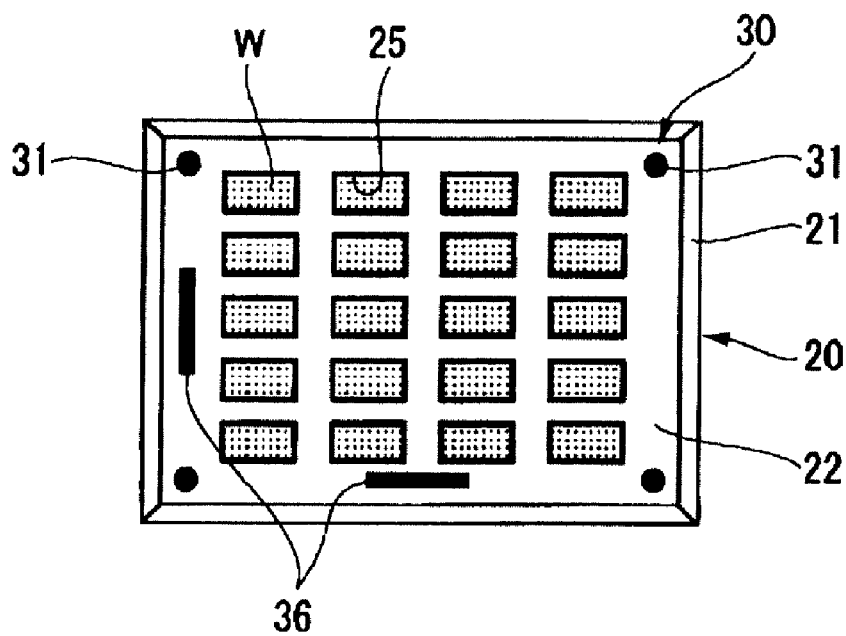
FIG. 3A is a descriptive view showing an example sorting tray provided with a pattern marker used in the first exemplary embodiment.

In the present exemplary embodiment, as shown in FIGS. 2 and 3A, the sorting tray 20 has a dish-shaped tray main body 21 that may be piled up. Workpiece storage indentations 25 aligned in vertical and horizontal directions are formed in the tray main body 21. The workpiece W is stored, in a collectable manner, in each of the workpiece storage indentations 25.

The robot 50 is equipped with a robot hand 52 capable of performing gripping action that is provided at an extremity of a robot arm 51 that may move by means of multiaxial joints. Processing operation to be performed by the robot hand 52 is instructed in accordance with input locus information, such as a motion capture. A correction is made to the processing operation performed by the robot hand 52 according to the imaging information received from the camera 40.

In the exemplary embodiment, the camera 40 is fixed to a portion of the robot hand 52 and is placed at a predetermined measurement position by the robot hand 52.

<Pattern Marker>

In the exemplary embodiment, as shown in FIG. 3A, the pattern marker 30 takes a top surface 22 of the tray main body 21 of the sorting tray 20 as a recognition reference plane. The pattern marker 30 has unit pattern marks 31 respectively placed at four corners of the top surface 22 and type indication marks 36 provided along two adjacent sides of the top surface 22 of the tray main body 21.

Figure 3B:
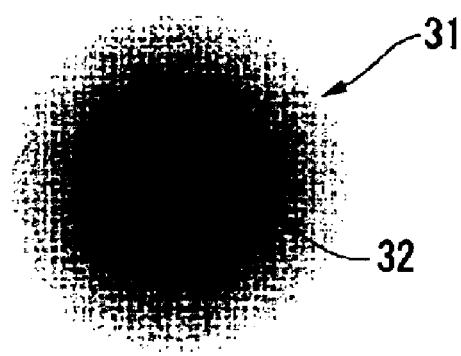
FIGS. 3B and 3C are descriptive views showing an example structure of a unit pattern mark that is one element of the pattern marker.
Figure 4A:
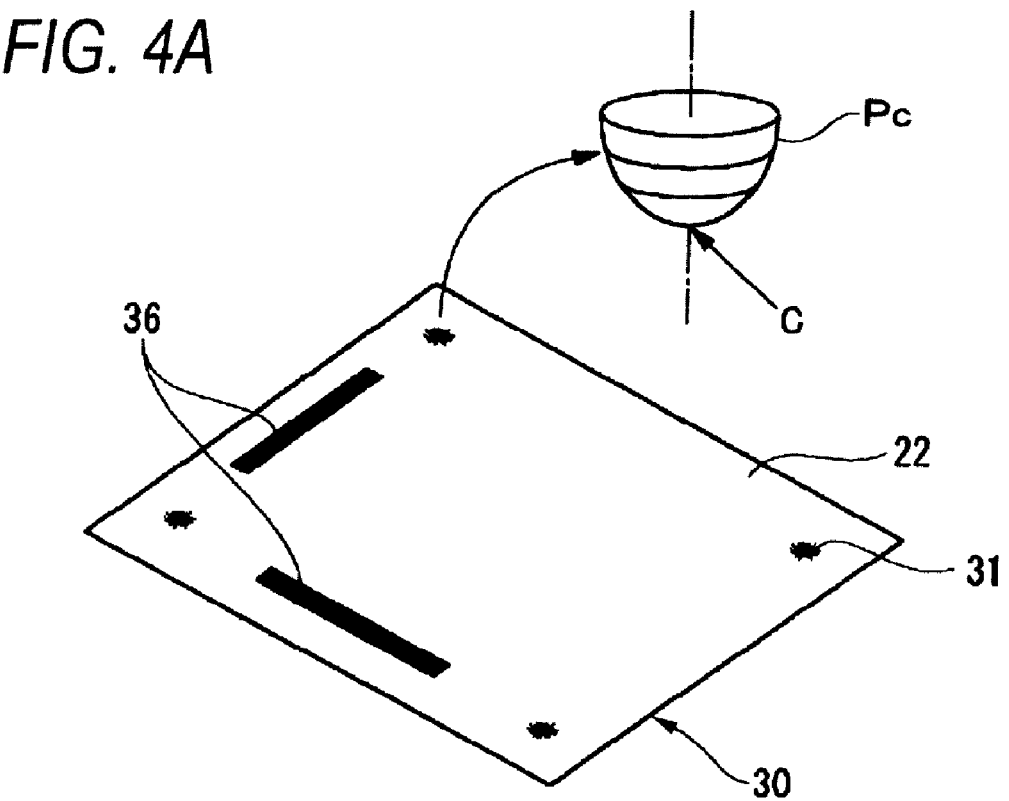
FIG. 4A is a descriptive view schematically showing a characteristic of a unit pattern mark of the pattern marker used in the first exemplary embodiment.

As shown in FIGS. 3B and 4A, one typical configuration of each of the unit pattern marks 31 is illustrated as a gradation 32 having a density pattern Pc that exhibits the highest density at a center position C and that sequentially changes so as to become less dense with an increasing distance toward a periphery of the mark.

Figure 3C:
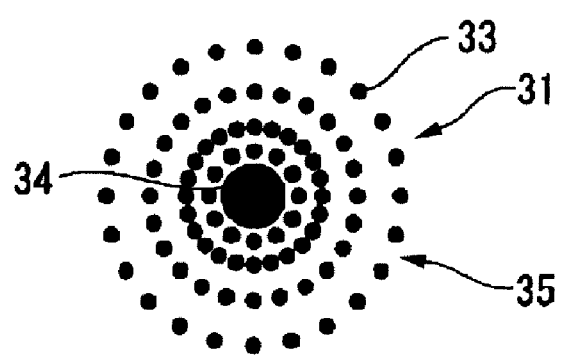

As shown in FIGS. 3C and 4A, another typical configuration of the unit pattern mark 31 is illustrated as a dot pattern. In the dot pattern, the most dense distribution of dots 33 appears at the center position C, thereby forming a high density region 34, and the distribution of the dots 33 becomes gradually coarse toward a periphery of the mark, thereby forming a low density region 35. In this case, the density distribution may be given to the unit pattern mark by means of changing a diameter size of the dot 33, spacing between the dots, and a layout position.

In particular, the dot pattern configuration is preferable, because the dot pattern is easily made by means of printing operation utilizing an inkjet imaging forming apparatus or an electrophotographic image forming apparatus.

Meanwhile, for instance, when there are plural of types of workpieces W to be housed (in terms of; for instance, color types, size types, and the like), the type indication marks 36 act as ID (identification) indications used for finding matching with workpieces W of a corresponding type. In the present exemplary embodiment, the type indication marks 36 are provided at two locations but may also be provided at one location. Alternatively, the type indication marks may also be placed at three locations or more in a split manner.

—Comparison with an LED Indication Plate—

Figure 4B:
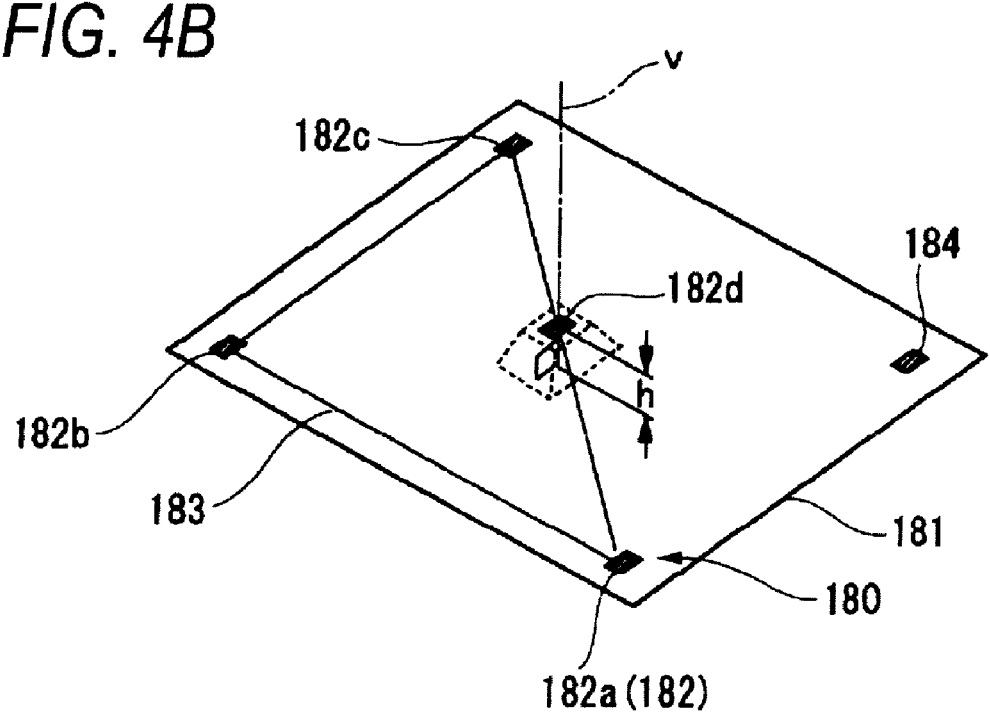
FIG. 4B is a descriptive view showing an example structure of markers used in a comparative mode.

Unlike the pattern marker 30, an LED indication plate 180 shown in FIG. 4B has four LEDs 182 (182a to 182d) provided on a substrate 181. The three LEDs 182 (182a to 182d) of the four LEDs 182 are placed on a single plane of the substrate 181. The remaining one LED 182 (182d) is set on a vertical line "v" that is spaced "h" apart from a triangular reference plane 183 including the three LEDs 182 as apexes. A position and an attitude of the triangular reference plane 183 is determined from a positional relationship between the triangular reference plane 183 and the LED 182 (182d) on the vertical line "v." Reference numeral 184 designates an LED for identification.

Even by means of the LED indication plate 180, the position and the attitude of the sorting tray 20 are surely recognized, but an electric power source for enabling use of the LED 182 is required. Therefore, the pattern marker 30 of the present exemplary embodiment is preferable in terms of such a power source being unnecessary.

Figure 5:
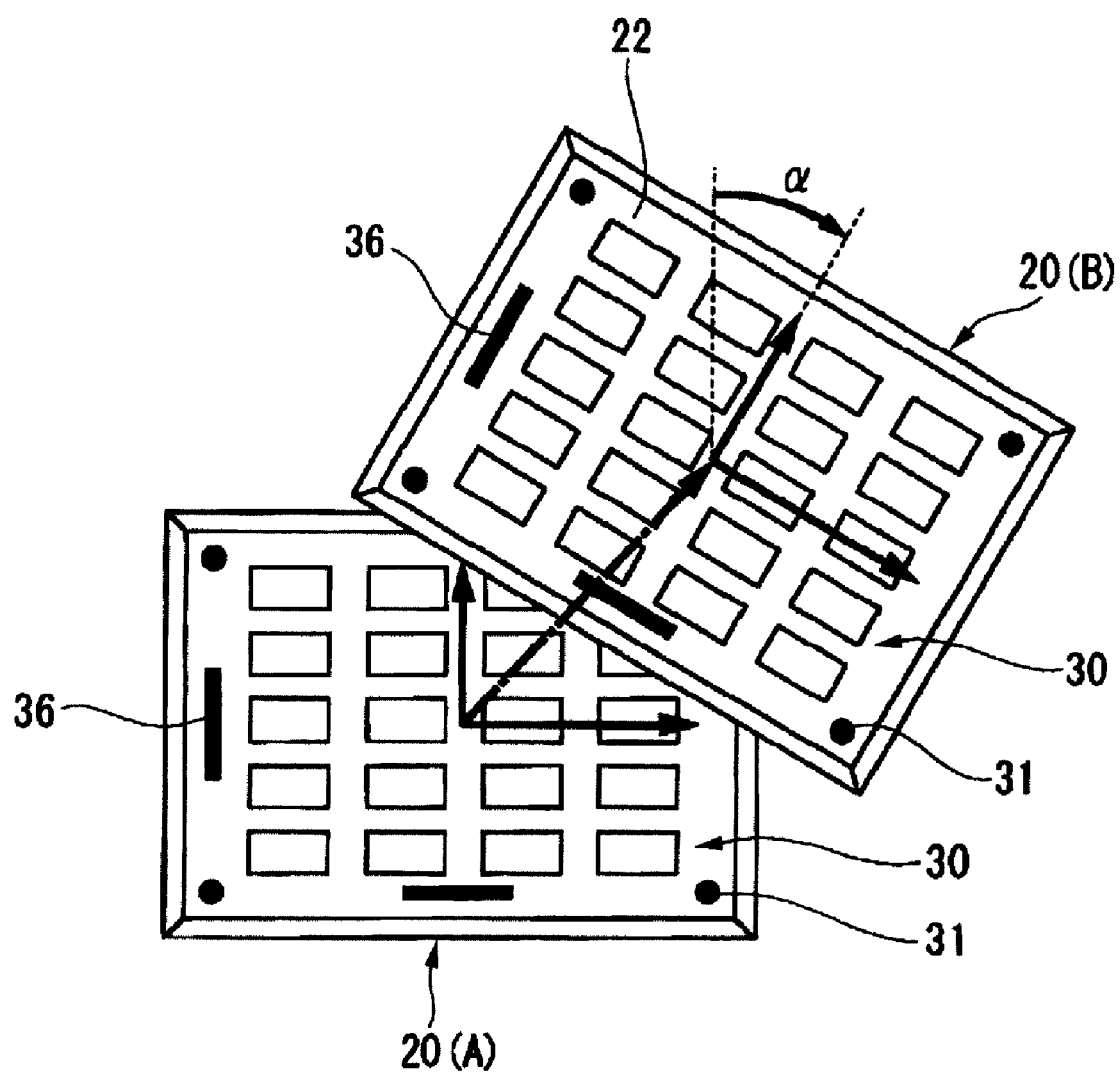
FIG. 5 is a descriptive view showing a principle on the basis of which a position and an attitude of an assembly component are set by means of the pattern marker used in the first exemplary embodiment.

The LED indication plate 180 adopts a technique for enhancing the accuracy of recognition of the position and the attitude by placing the four LEDs 182 in a three-dimensional manner. However, the pattern marker 30 has a density distribution in which the unit pattern mark 31 sequentially changes toward its periphery from its center position C. Therefore, the center position C of the density distribution (i.e., a point where the highest density is exhibited) may be calculated with high accuracy by means of a density distribution approximation expression. Therefore, because of high accuracy of recognition of the unit pattern marks 31, even when four unit pattern marks 31 are placed on a single plane, the position of an apex corresponding to the center position C of the four unit pattern marks 31 is recognized. As a result, even if the sorting tray 20 has changed from a position A to a position B incidental to rotation effected through a rotation angle α as shown in FIG. 5, the position and the attitude of the top plane 22 that is a recognition reference plane of the sorting tray 20 will be accurately recognized.

In the present exemplary embodiment, the unit pattern marks 31 are provided in number of four on the single plane. However, the number of unit pattern marks is not limited to four. The unit pattern marks 31 may also be provided at arbitrary six points, or the like. Specifically, the unit pattern marks may be appropriately selected, so long as the marks enable recognition of a three-dimensional position and attitude of the sorting tray. The essential requirement is to provide the unit pattern marks 31 in number of four or more, and locations where the unit pattern marks 31 are to be placed are not limited to a single plane but may also be set over different planes.

—Example Generation of the Pattern Marker—

Figure 6:
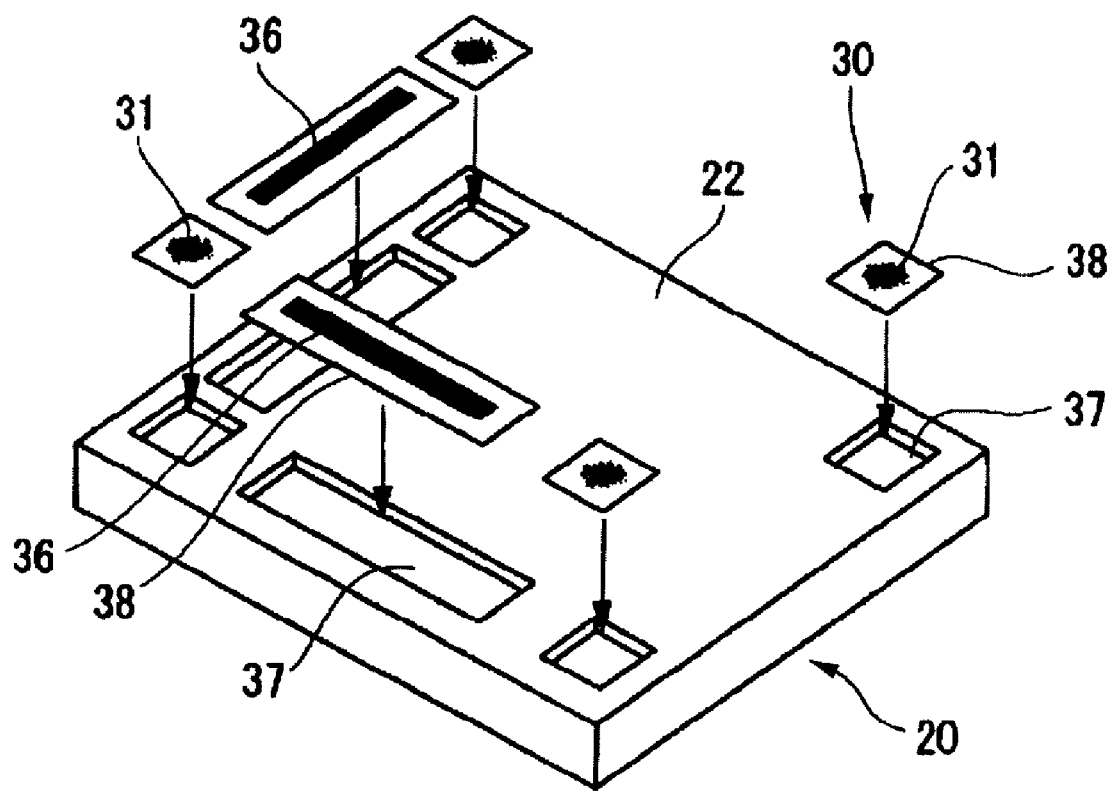
FIG. 6 is a descriptive view showing example manufacture of the pattern marker used in the first exemplary embodiment.

In the present exemplary embodiment, as shown in; for instance, FIG. 6, the pattern marker 30 includes attachment indentations 37 respectively made at four corners and along two sides of the top surface 22 of the sorting tray 20; and labels 38, each of which is printed with the unit pattern mark 31 and the type indication mark 36, are affixed to the respective attachment indentations 37. At this time, for instance, the depth of each of the attachment indentations 37 is selected so as to become equal to the thickness of each of the labels 38. The unit pattern marks 31 and the type indication marks 36 are set so as to become flush with the top surface 22 that serves as the recognition reference plane. Although the pattern marker 30 is set so as to become flush with the top surface 22 that is to serve as the recognition reference plane, the pattern marker 30 does not always need to become flush with the top surface 22. Further, in the present exemplary embodiment, the labels 38 are affixed to the sorting tray by way of the attachment indentations 37. The labels may also be affixed directly to the top surface 22 that is to serve as a recognition reference plane, without involvement of the attachment indentations 37.

Moreover, in the present exemplary embodiment, it is desirable to place the unit pattern marks 31 of the pattern marker 30 while spaced apart from respective edges of the top surface 22 of the sorting tray 20 by a certain extent.

Figure 7:
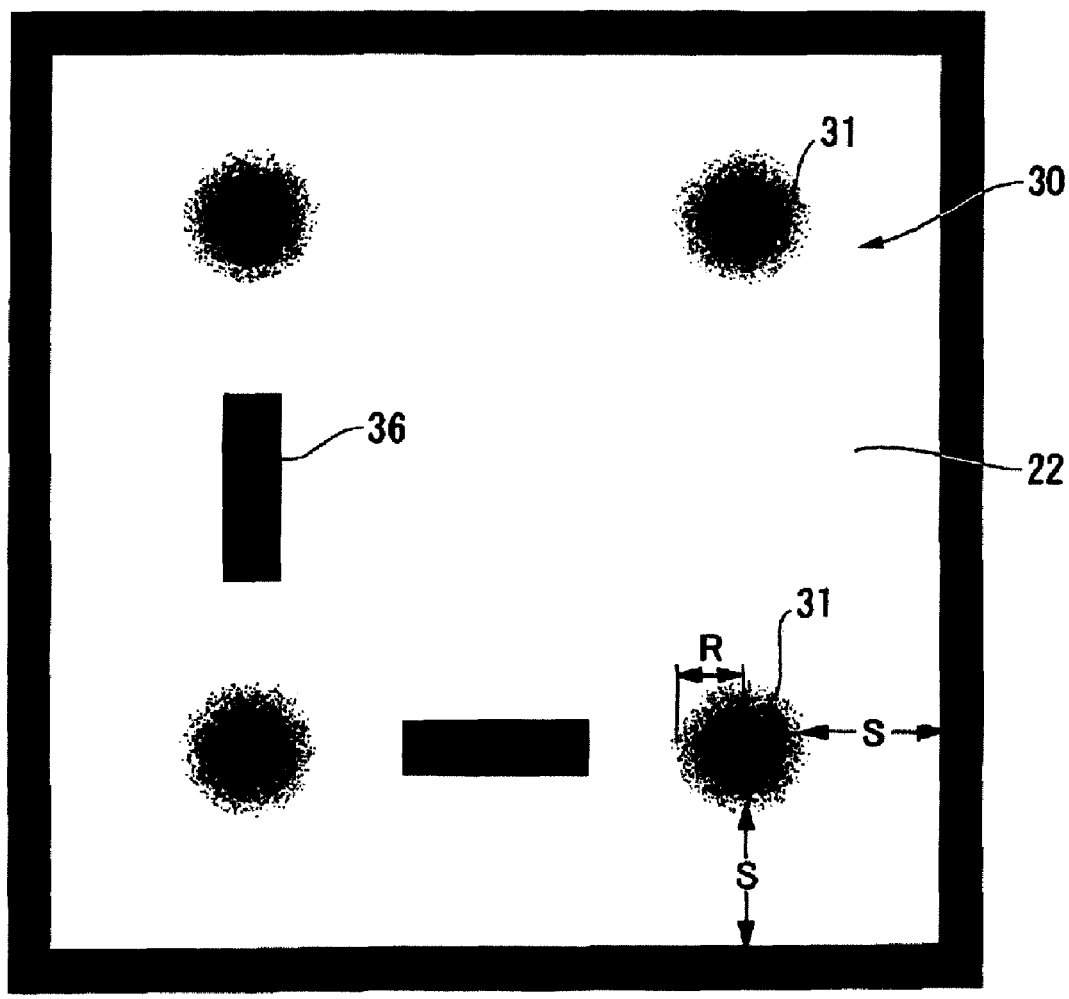
FIG. 7 is a descriptive view showing an example structure and dimensions of each of the pattern marker used in the first exemplary embodiment.

For instance, as shown in FIG. 7, provided that the radius of the unit pattern mark 31 is taken as R and that an interval between the outermost contour of the unit pattern mark 31 and the edge of the top plane 22 is taken as S, fulfillment of S>2R is desirable. This is attributable to an algorithm for detecting the center position C of the unit pattern mark 31 with high accuracy. A relationship of S>2R is fulfilled in such a way that a rectangular detection window to be superposed on a circular pattern of the unit pattern mark 31 does not overlap an edge (indicated by a black edge) of the top surface 22 of the sorting tray 20. As a matter of course, a layout of the unit pattern mark 31 may arbitrarily be set, so long as a different detection algorithm is used for the pattern marker 30.

<Measurement Position of the Camera>

In the present exemplary embodiment, the camera 40 is disposed opposite the pattern marker 30 in order to make it possible to capture an image of the pattern marker 30 on the sorting tray 20.

When study of a measurement position of the camera 40 achieved is performed at this time, configurations shown in FIGS. 8A to 8C are mentioned.

First, the configuration shown in FIG. 8A is for a case where a center position of an imaging plane (i.e., a center position of a view field range) of the camera 40 includes the center position C of the four unit pattern marks 31 of the pattern marker 30 on the sorting tray 20 and where the center position is a face-up measurement position where the center position directly faces up to the top surface 22 that is the recognition reference plane.

The configuration excites an apprehension of deterioration of accuracy of measurement of a distance between the camera 40 and the pattern marker 30.

Figure 9A:
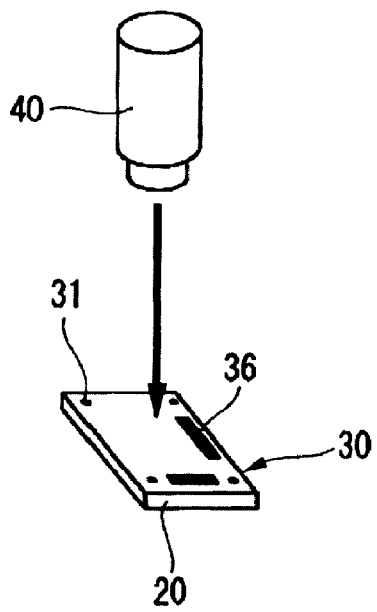
FIG. 9A is a descriptive view schematically showing a configuration in which the imaging plane of the camera serving as an imaging tool is placed at the face-up measurement position with respect to the point of center origin of the pattern marker and FIG. 9B is a descriptive view showing measurement accuracy achieved in the case shown in FIG. 9A.
Figure 9B:
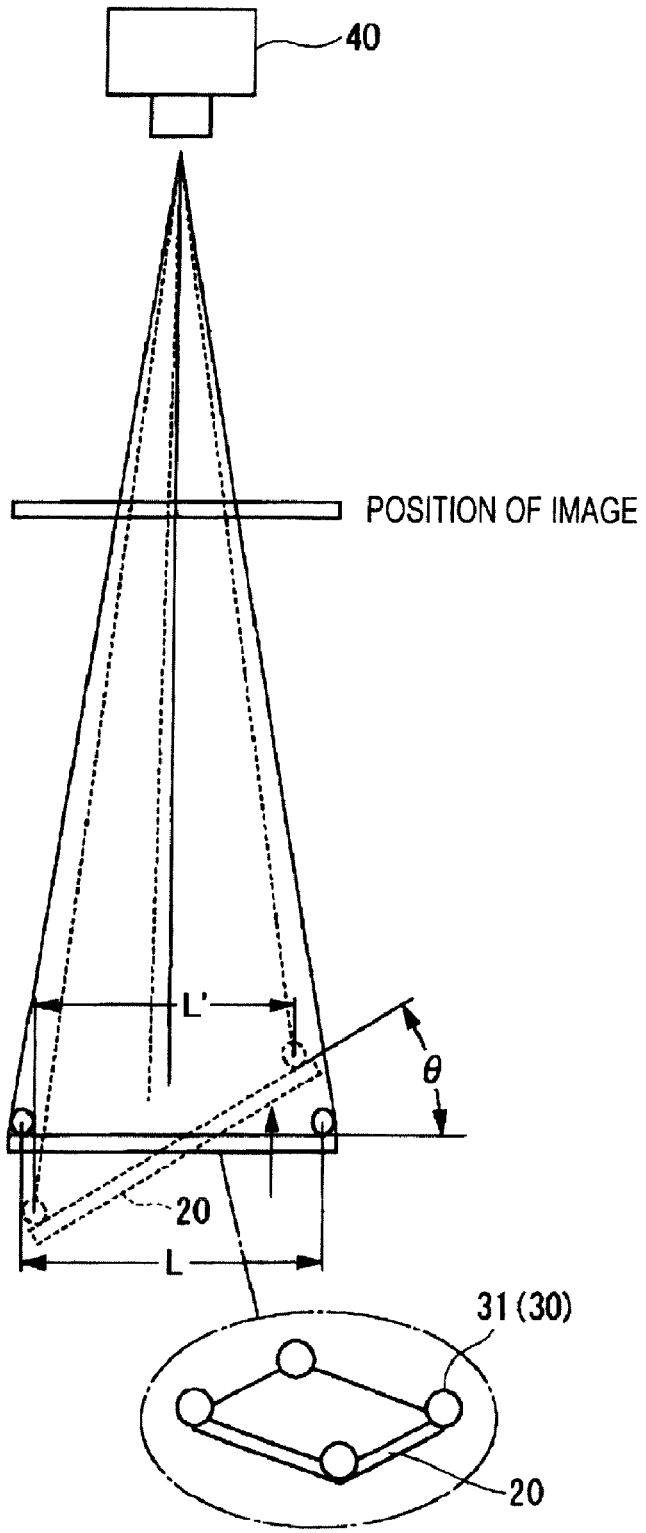

As shown in FIGS. 9A and 9B, when the camera 40 is disposed opposite the pattern marker 30, a widthwise dimension between the unit pattern marks 31 of the pattern marker 30 is taken as an image size L to be captured by the camera 40. Further, a change in image size resultant from occurrence of a minute change in the pattern marker 30 by merely an amount of θ on the top surface 22 that is a recognition reference plane of the sorting tray 20 is taken as L', a relationship of L'=L×cos Φ is fulfilled.

Therefore, the change L' in image size becomes smaller than the original image size L, so that measurement accuracy is understood to become deteriorated.

Next, in the configuration shown in FIG. 8B, the camera 40 is shifted in parallel with the surface of the pattern marker 30 in such a way that the center position of the view field range of the camera 40 from the position shown in FIG. 8(A) becomes offset from the center position C of the four unit pattern marks 31 of the pattern marker 30, to thus become offset from the face up measurement position shown in FIG. 9A.

In this case, when compared with the accuracy of measurement achieved in the case shown in FIG. 9A, the accuracy of measurement of the camera 40 is further enhanced. However, the pattern marker 30 comes to a position that is offset from the center position C of the view field range of the camera 40, and there is apprehension that measurement accuracy becomes deteriorated under influence of a lens distortion of the camera 40. At this time, even when a correction is made to lens distortion, measurement accuracy tends to fall at this time. Therefore, it is preferable to take an additional remedial measure.

On the contrary, a configuration shown in FIG. 8C is a case where the imaging plane of the camera 40 and the surface of the pattern marker 30 (equivalent to the top surface 22 of the assembly component 20 that is the recognition reference plane) do not face up to each other and where the center of the view field range of the camera 40 is placed in alignment with the center position C of the four unit pattern marks 31 of the pattern marker 30. Namely, the configuration is a case where the imaging plane of the camera 40 is placed at an inclination with respect to the recognition reference plane of the pattern marker 30 as shown in FIG. 8C, and measurement accuracy of the camera 40 is enhanced. Namely, on the assumption of cases shown in FIGS. 9A and 9B, the configuration shown in FIG. 8C may be considered as a case where the assembly component is tilted by an image size L'. A change in image size is considered to come to L as a result of the assembly component being turned through B. In this case, the change in image size is L=L'/cos θ. Accordingly, as the change in θ becomes larger, a change in the value of cos θ becomes larger. A change in image size is accordingly given as a larger change.

Therefore, in the configuration shown in FIG. 8C, the measurement accuracy of the camera 40 is understood to be enhanced.

The tilt angle θ may be selected as required. However, the tilt angle may fall within a range from 15° to 75°. In view of enhancement of measurement accuracy, setting the tilt angle around 45° or thereabouts is particularly preferable.

For instance, as shown in FIG. 2, in a configuration where the camera 40 is attached to the robot handle 52, a distance over which the robot hand 52 is moved to the position of the workpiece W on the sorting tray 20 after measurement becomes larger as the tilt angle θ becomes greater, which affects a production tact. When consideration is given to the production tact, the minimum tilt angle θ in a range where measurement accuracy may be assured is desirable.

<Workpiece Collection Processing>

Work collection processing performed by the collection processing apparatus of the present exemplary embodiment is now described.

First, the controller 60 performs processing pertaining to a flowchart shown in FIG. 10 and transmits a control signal to the camera 40 and the robot 50.

In the drawing, the controller 60 first measures the pattern marker 30 on the sorting tray 20 by means of the camera 40; subsequently recognizes the layout information about the position and the attitude of the sorting tray 20; and indirectly recognizes the layout information about positions and attitudes of respective workpieces W housed in the sorting tray 20.

Subsequently, the controller 60 determines moving action of the robot hand 52 and collects the workpiece W by means of the robot hand 52 in order to move the workpiece to a predetermined area.

The controller 60 then checks whether or not processing for collecting the workpiece W of the sorting tray 20 by means of the robot hand 52 is completed. Processing for recovering an empty sorting tray 20 is performed at a point in time when processing for collecting all of the workpieces W in the sorting tray 20 is completed.

Detailed example processing for recovering the empty sorting tray 20 will be described in connection with a fourth exemplary embodiment to be described later.

Second Exemplary Embodiment

Figure 11A:
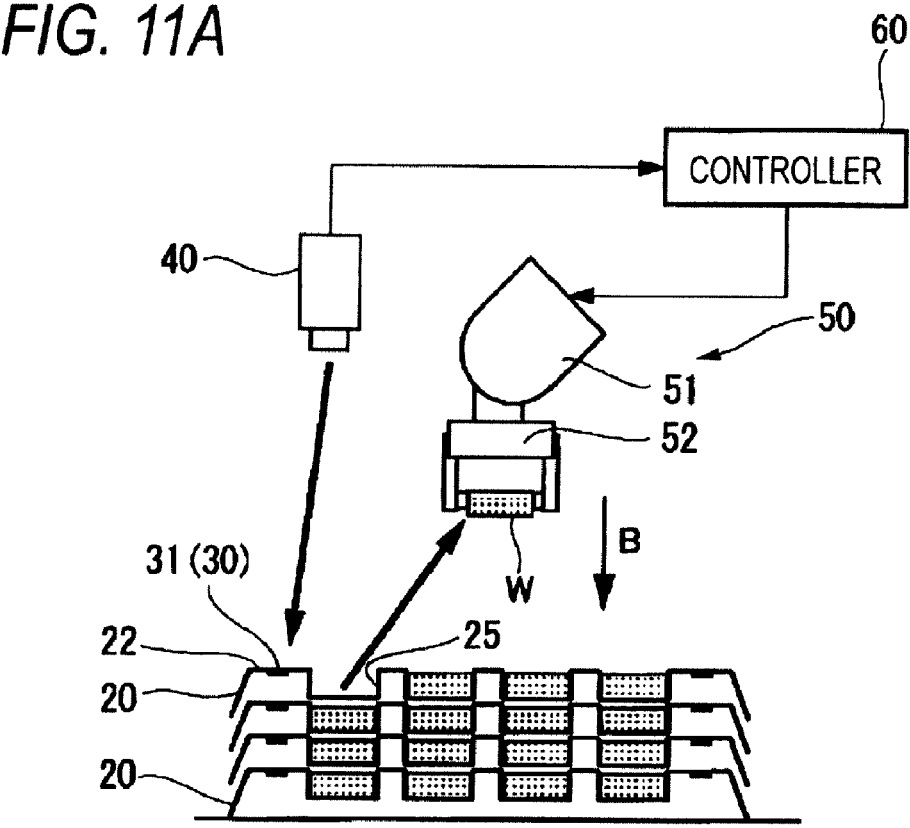
FIG. 11A is a descriptive view showing an overall structure of a collection processing apparatus of a second exemplary embodiment.
Figure 11B:
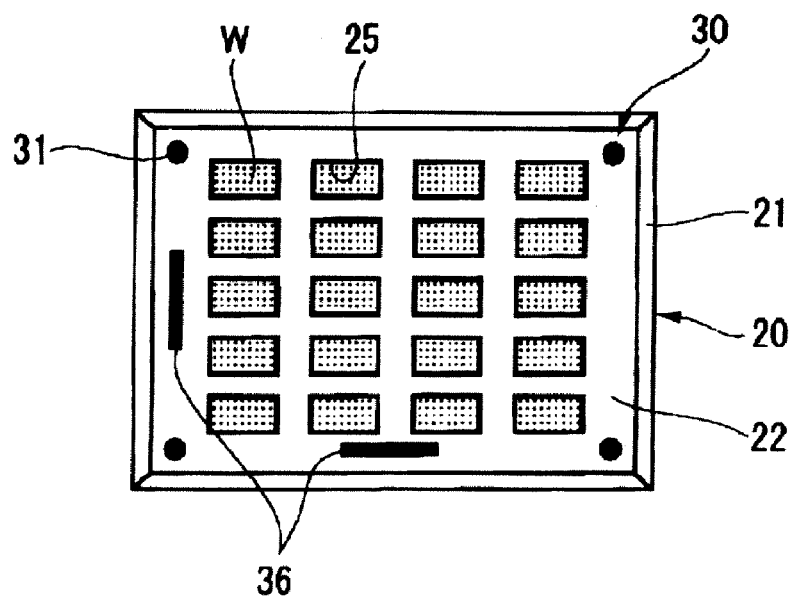
FIG. 11B is an arrowy view achieved when the apparatus is viewed in direction B shown in FIG. 11A.

FIG. 11A is a descriptive view showing an overall structure of a collection processing apparatus of a second exemplary embodiment of the present invention.

In the drawing, the collection processing apparatus is substantially analogous to its counterpart described in connection with the first exemplary embodiment in terms of a basic structure. However, unlike the first exemplary embodiment, the camera 40 is separated from the robot hand 52 and provided stationarily. Elements analogous to those described in connection with the first exemplary embodiment are assigned reference numerals analogous to those employed in the first exemplary embodiment, and their detailed explanations are omitted here for brevity.

In the present exemplary embodiment, all you need to do is to previously set the camera 40 at a location where the camera may capture an image of the pattern marker 30 on the sorting tray 20. It is thereby possible to recognize layout information about the position and the attitude of the sorting tray 20 by means of capturing an image of the pattern marker 30 with use of the camera 40 and, by extension, it is possible to indirectly recognize layout information about the position and the attitude of each of the workpieces W of the sorting tray 20.

Therefore, processing for collecting the workpieces W of the sorting tray 20 is performed in substantially the same manner as in the first exemplary embodiment.

Third Exemplary Embodiment

Figure 12:
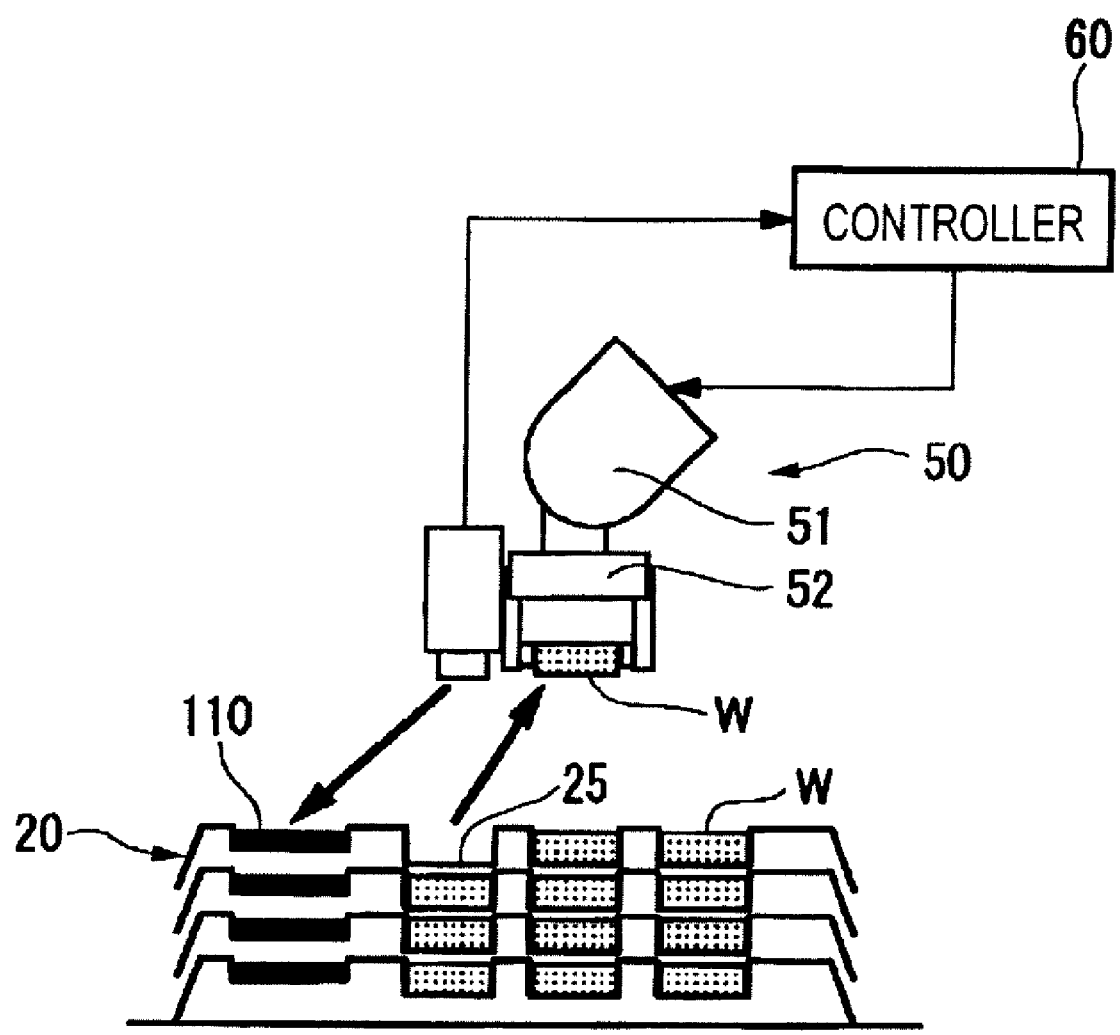
FIG. 12 is a descriptive view showing an overall structure of a collection processing apparatus according to a third exemplary embodiment.

FIG. 12 shows an overall structure of a collection processing apparatus of a third exemplary embodiment.

In the drawing, the collection processing apparatus is substantially analogous to its counterpart described in connection with the first exemplary embodiment in terms of a basic structure. A pattern marker 110 added to the sorting tray 20 structurally differs from the pattern marker 30 described in connection with the first exemplary embodiment. Elements analogous to those described in connection with the first exemplary embodiment are assigned reference numerals analogous to those employed in the first exemplary embodiment, and their detailed explanations are omitted here for brevity.

Figure 13A:
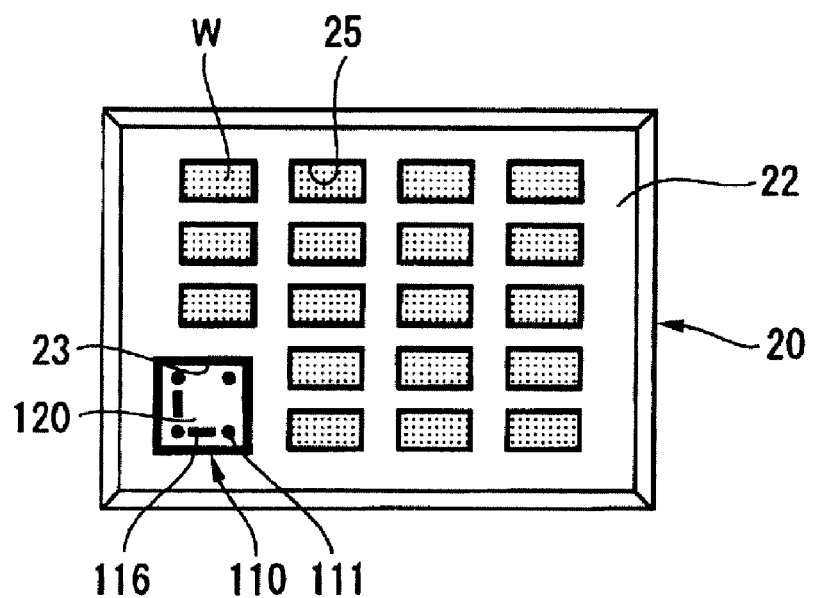
FIG. 13A is a planar descriptive view of a sorting tray.
Figure 13B:
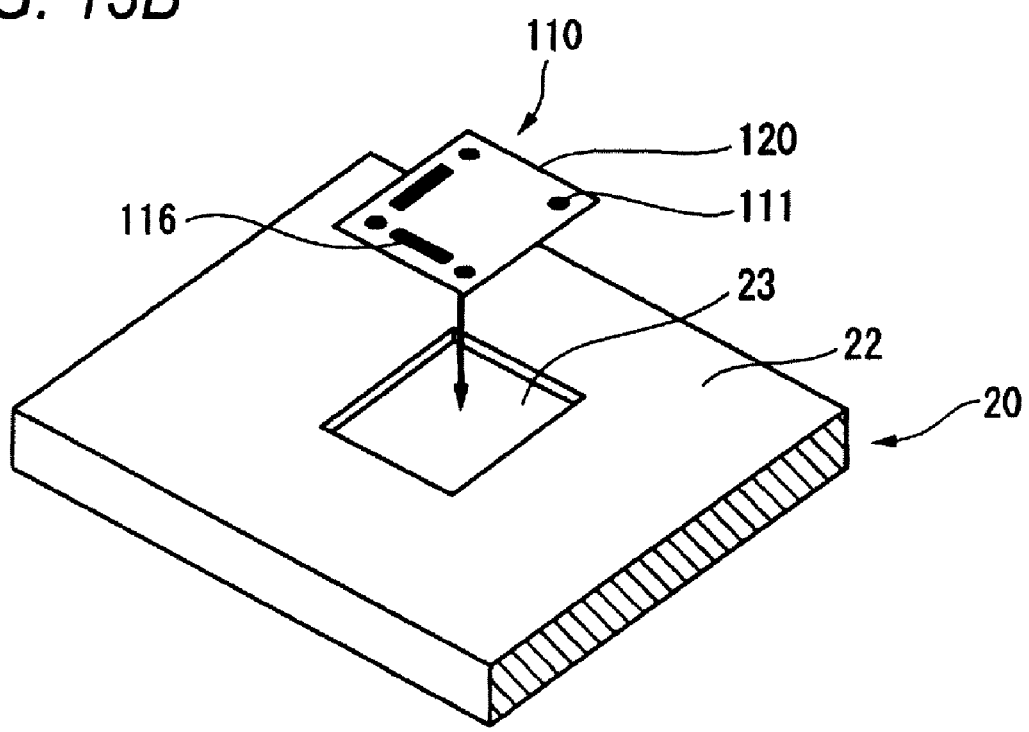
FIG. 13B is a descriptive view showing a general view of one of pattern markers added to the sorting tray.

In the present exemplary embodiment, the pattern marker 110 is printed on a front surface of a card 120 as show in FIG. 12 and FIGS. 13A and 13B. The card 120 is fixed to an attachment indentation 23 formed in a portion (e.g., a corner) of the top surface 22 of the sorting tray 20.

Figure 14A:
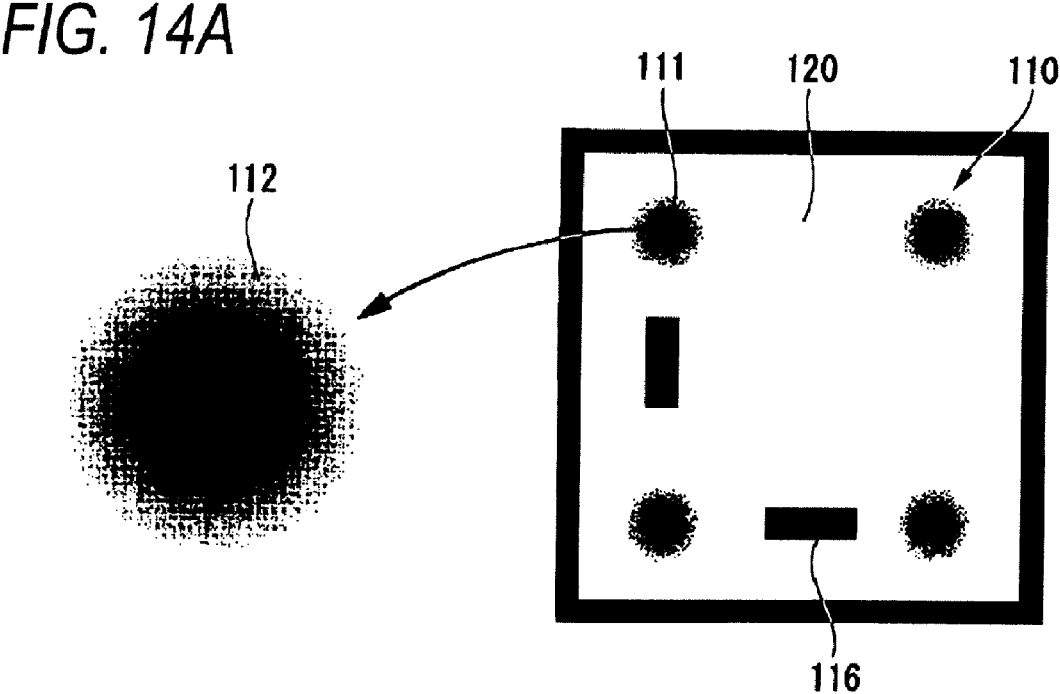
FIGS. 14A and 14B are descriptive views showing an example structure of the pattern marker used in the third exemplary embodiment.
Figure 14B:
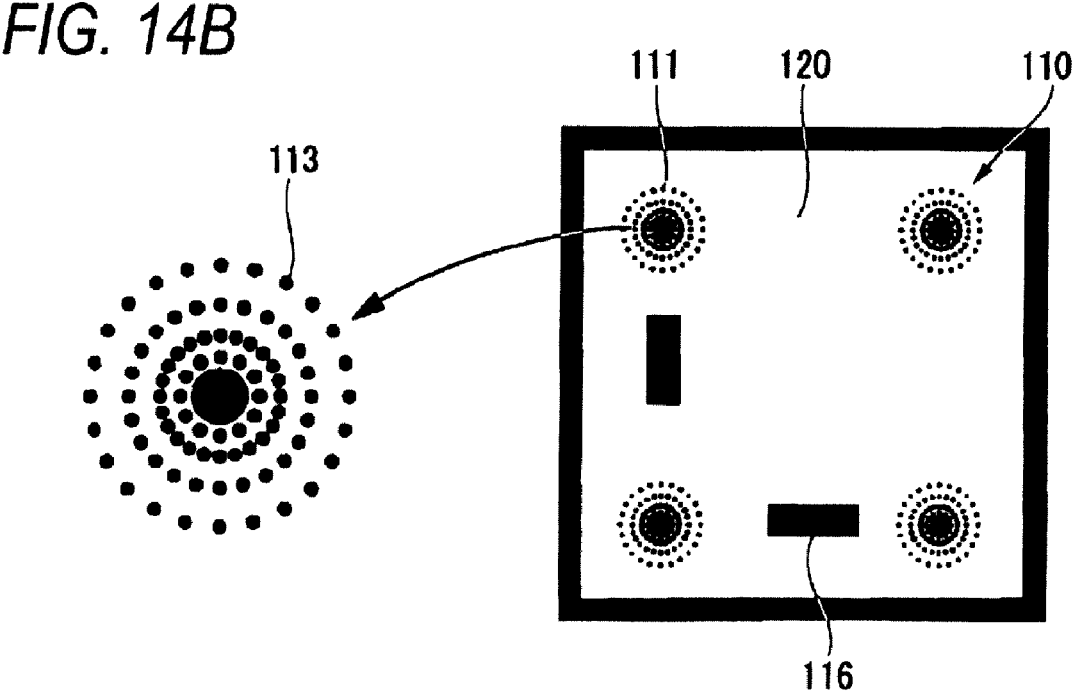

The pattern marker 110 includes several configurations as shown in FIG. 14A. For instance, as shown in FIG. 14B, there are mentioned a configuration including unit pattern marks 111 that are provided at respective four corners of the front surface of the card 120 and that each are made up of gradations 112 and type indication marks 116 provided along two sides of the front surface of the card 120; and a configuration including the unit pattern marks 111 that each are made up of; for instance, dot patterns 113 provided at the respective four corners of the front surface of the card 120 and the type indication marks 116 provided along the two sides of the front surface of the card 120.

<Method for Fixing the Pattern Marker>

The following is a method for fixing the pattern marker 110.

Figure 15A:
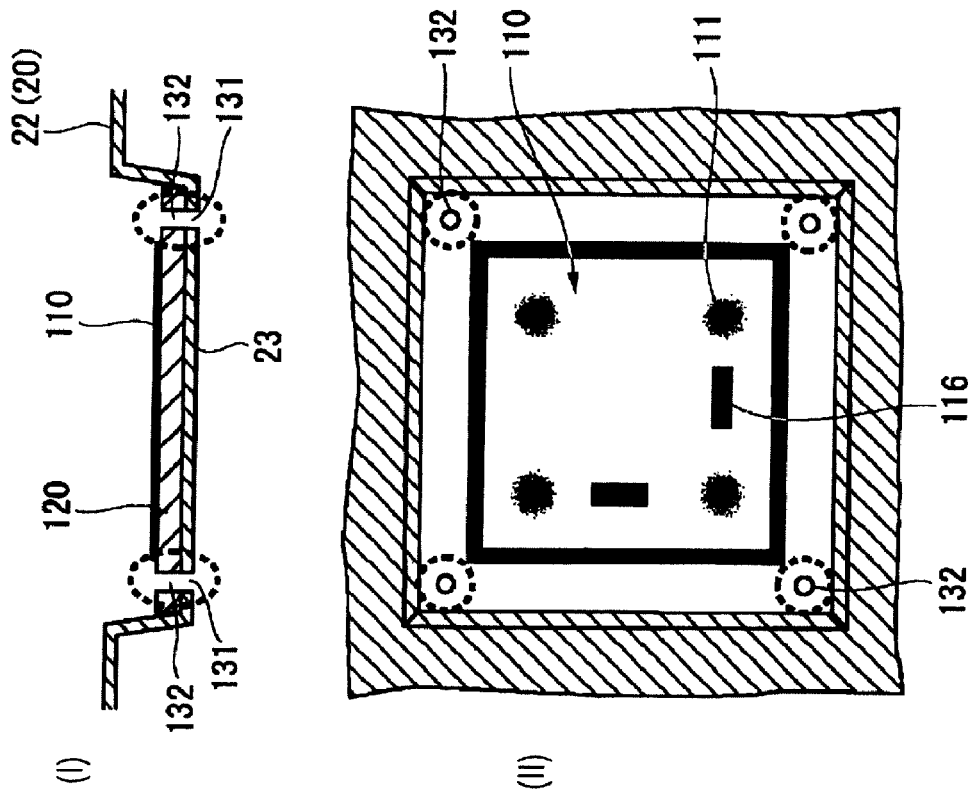
FIGS. 15A and 15B are descriptive views showing example fixing of the pattern marker employed in the third exemplary embodiment, wherein (I) they are cross sectional descriptive views of the respective pattern markers and (II) they are planar descriptive views of the respective pattern markers.

A configuration shown in FIG. 15A includes elastically deformable press protrusions 130 provided on a peripheral wall of the attachment indentation 23 formed in the top surface 22 of the sorting tray 20. The card 120 printed with the pattern marker 110 is housed in the attachment indentation 23 while the press protrusions 130 are being elastically deformed, whereby a periphery of the card 120 in the attachment indentation 23 is held down by the press protrusions 130. In the exemplary embodiment, the card 120 may be removed while the press protrusions 130 are being elastically deformed.

Figure 15B:
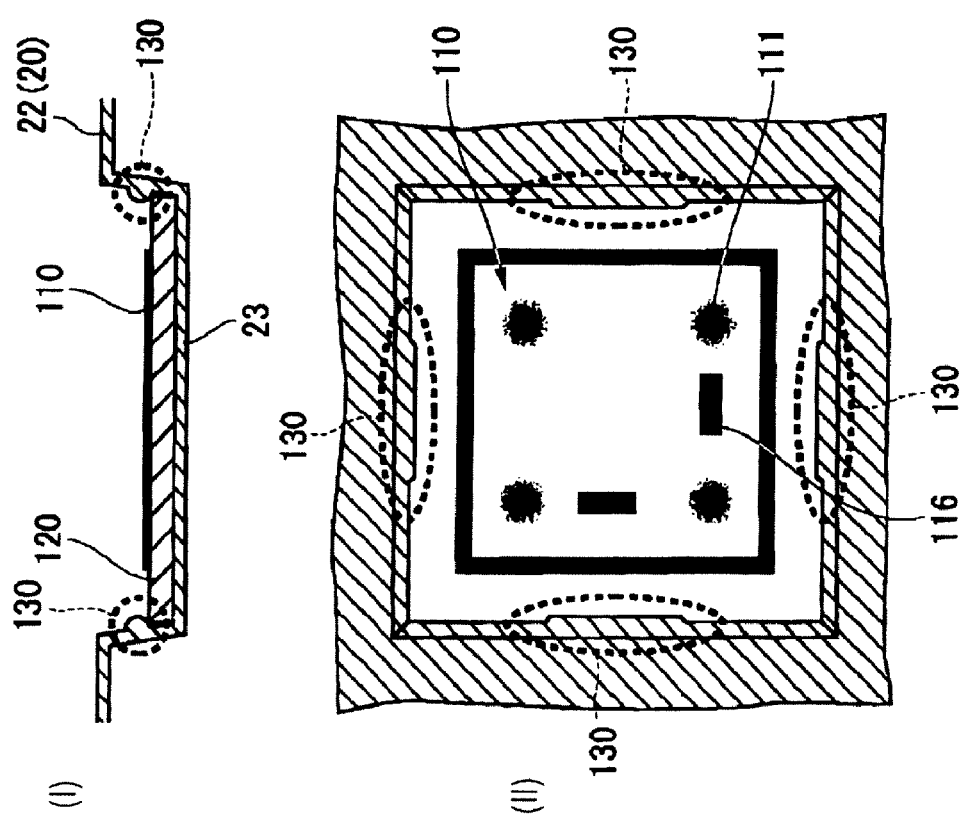

The configuration shown in FIG. 15B includes mount holes 131 and 132 opened at both the bottom of the attachment indentation 23 formed in the top surface 22 of the sorting tray 20 and at four corners of the card 120 printed with the pattern marker 110. The card 120 is fixed to the interior of the attachment indentation 23 by means of unillustrated fastening tools.

In a configuration shown in FIG. 16A, the pattern marker 110 is printed on a label 140 made of paper or a resin, and the label 140 is affixed to the bottom of the attachment indentation 23 of the sorting tray 20.

Moreover, in a configuration shown in FIG. 16B, the pattern marker 110 is printed directly on the bottom of the attachment indentation 23 of the top surface 22 of the sorting tray 20.

As mentioned above, in the present exemplary embodiment, a portion of the sorting tray 20 is provided with the pattern marker 110. The camera 40 measures the pattern marker 110 on the portion of the sorting tray 20, thereby recognizing layout information about the position and the attitude of the sorting tray 20. The layout information about the positions and attitudes of the respective workpieces W may be recognized on the basis of the layout information about the sorting tray. Processing for collecting the workpiece W is performed in the same manner as in the first exemplary embodiment.

Figure 17A:
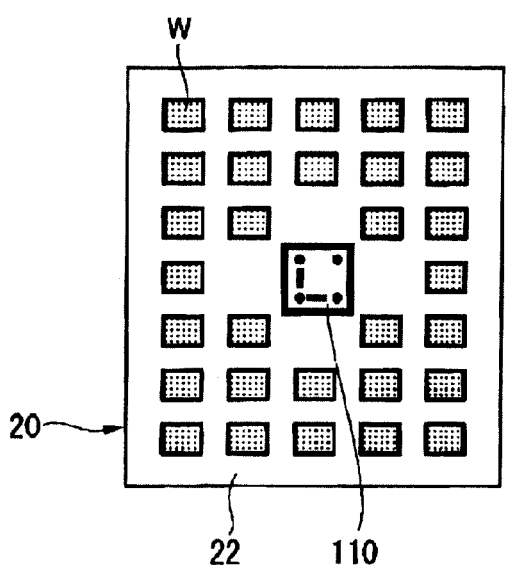
FIGS. 17A and 17B are descriptive views showing example layouts of the pattern markers used in the third exemplary embodiment.
Figure 17B:
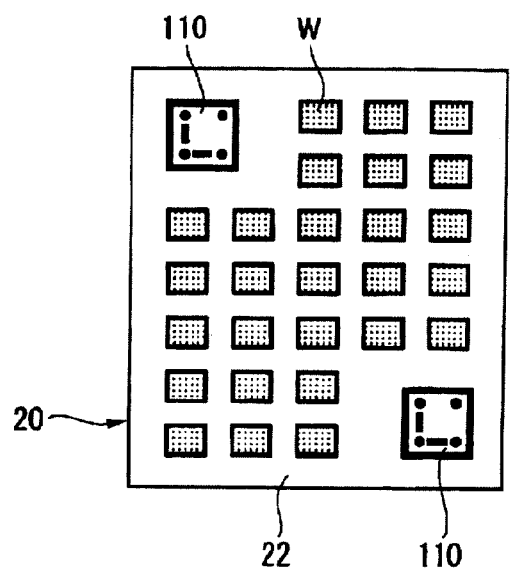

In the present exemplary embodiment, the pattern marker 110 is placed at one corner of the top surface 22 of the sorting tray 20. However, a modification may be made to the location where the pattern marker 110 is to be set, as required. For instance, as shown in FIG. 17A, in the case of the sorting tray 20 housing a large number of workpieces W, the pattern marker 110 may also be set in the vicinity of a center area of the top surface 22 of the sorting tray 20. Alternatively, as shown in FIG. 17B, the pattern marker 110 may also be set in numbers, like setting a pair of pattern markers 110 at respective diagonal corners on the top surface 22 of the sorting tray 20.

In particular, when the plurality of pattern markers 110 are set, layout information about the position and the attitude of an area corresponding to each of the pattern markers 110 may be recognized. Therefore, the layout information about the sorting tray 20 may be recognized more accurately.

Fourth Exemplary Embodiment

Figure 18A:
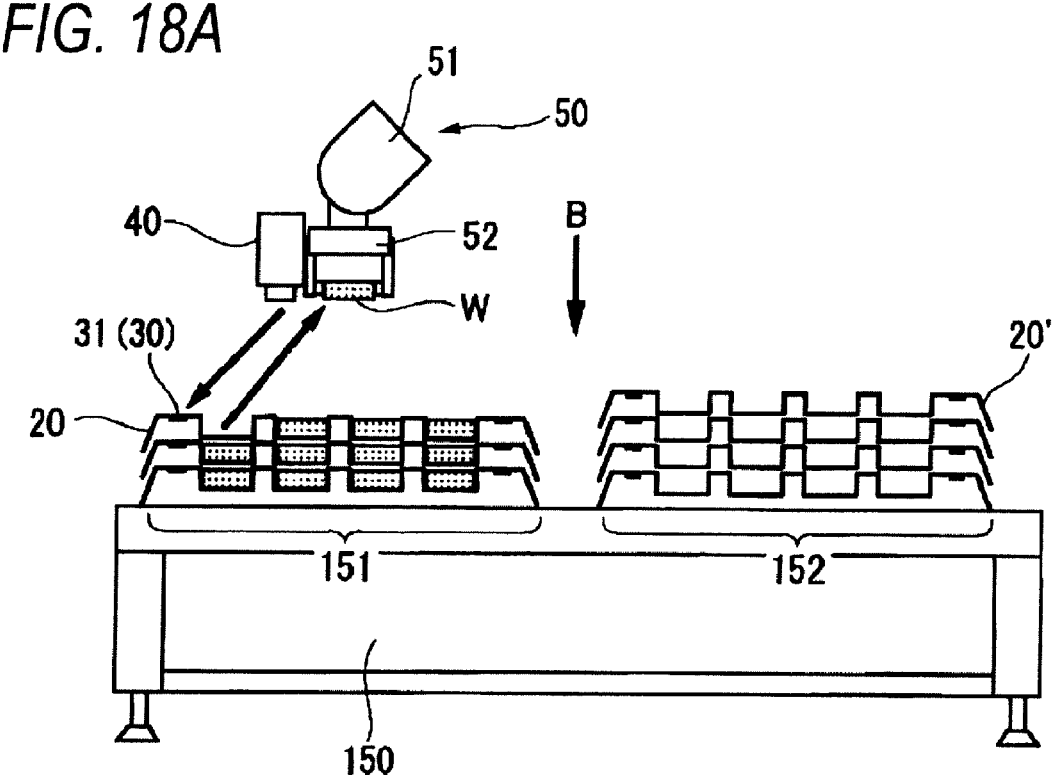
FIG. 18A is a descriptive view showing an overall structure of a collection processing apparatus of a fourth exemplary embodiment.
Figure 18B:
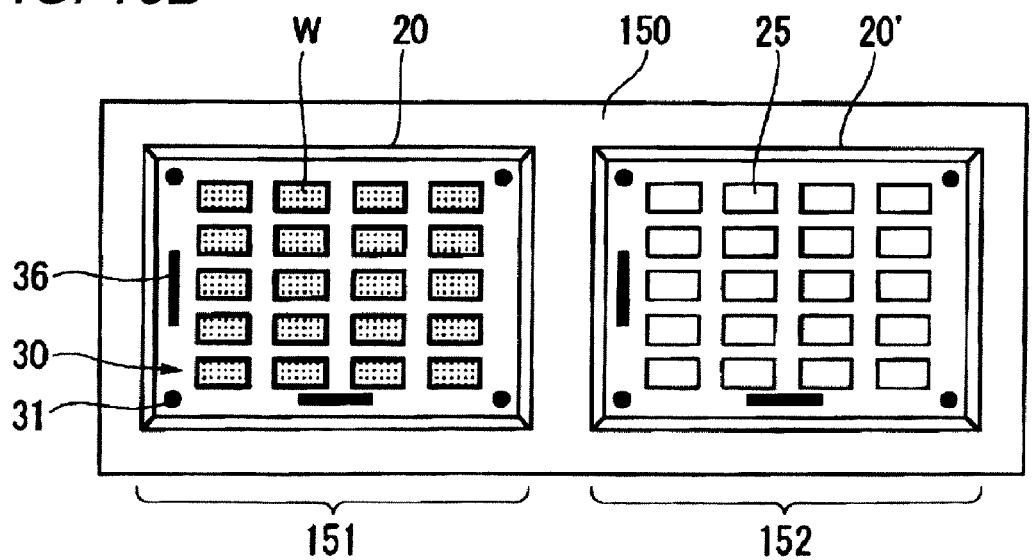
FIG. 18B is a planar descriptive view of a processing stage of the collection processing apparatus.

FIGS. 18A and 18B show an overall structure of a collection processing apparatus of a fourth exemplary embodiment.

In the drawings, the collection processing apparatus subjects the workpieces W held in the sorting tray 20 to collection processing and performs for recovering the empty sorting tray 20' that has become empty as a result of completion of processing for collecting the workpieces W (one configuration for collection processing).

In the drawings, reference numeral 150 designates a tray rest on which the sorting tray 20 housing workpieces W (the tray is referred to as a "filled tray," as required, in the exemplary embodiment) and an empty sorting tray 20' having become empty as a result of completion of collection of the workpieces W (the tray is referred to as an "empty tray," as required, in the exemplary embodiment). An filled tray storage space 151 and an empty tray storage space 152 are assured, adjacently to each other, on the tray placement table 150.

In the exemplary embodiment, a controller not included in the drawings controls imaging timing of the camera 40; controls the robot 50; performs processing for collecting the workpiece W that is substantially analogous to that described in connection with the first exemplary embodiment; and further performs processing for recovering an empty tray along a flowchart shown in FIG. 19.

Processing for recovering an empty tray performed by the collection processing apparatus of the present exemplary embodiment is now schematically illustrated.

First, the controller sequentially iterates processing for collecting each of the workpieces W in the sorting tray 20.

Figure 19:
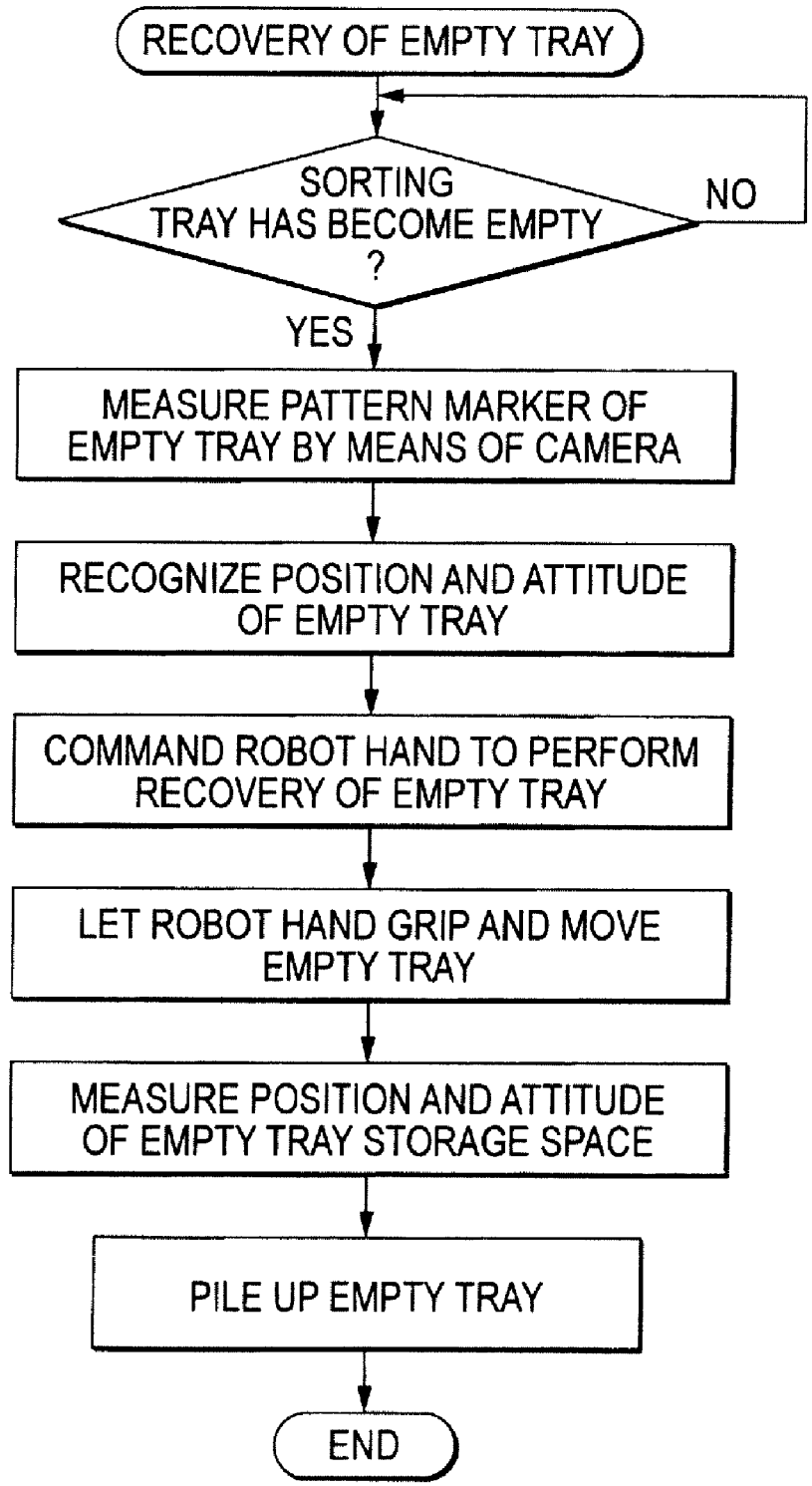
FIG. 19 is a flowchart showing processes for recovering an empty tray of the collection processing apparatus of the fourth exemplary embodiment shown in FIG. 20.
Figure 20A:
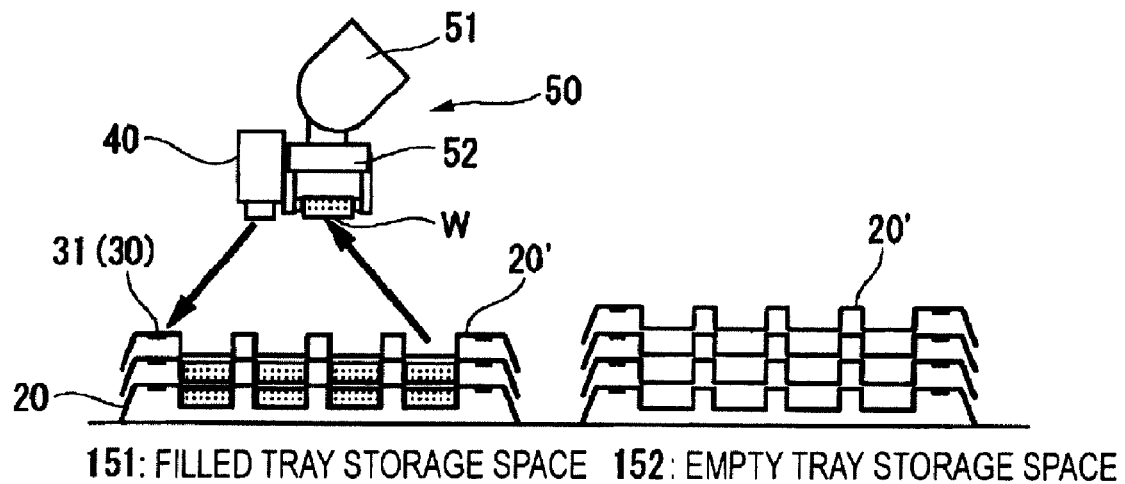
FIG. 20A is a descriptive view showing a state of the sorting tray when taking out of a workpiece is completed.
Figure 20B:
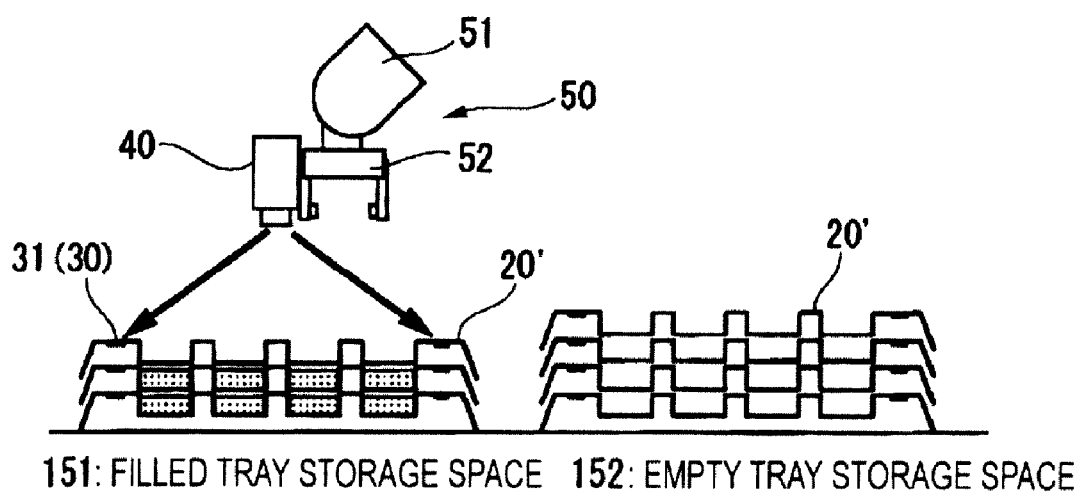
FIG. 20B is a descriptive view showing a process of measuring layout of an empty tray.

As shown in FIG. 19, the controller monitors the entirety of the sorting trays 20 by means of for instance, the camera 40 and checks whether or not entire processing for taking the workpieces W out of the predetermined sorting tray 20 (workpiece pickup processing) is completed. As shown in FIG. 20A, provided that the sorting tray 20 has become the empty tray 20', the pattern marker 30 of the empty tray 20' of the filled tray storage space 151 is measured by means of the camera 40 (see FIG. 20B).

Figure 21A:
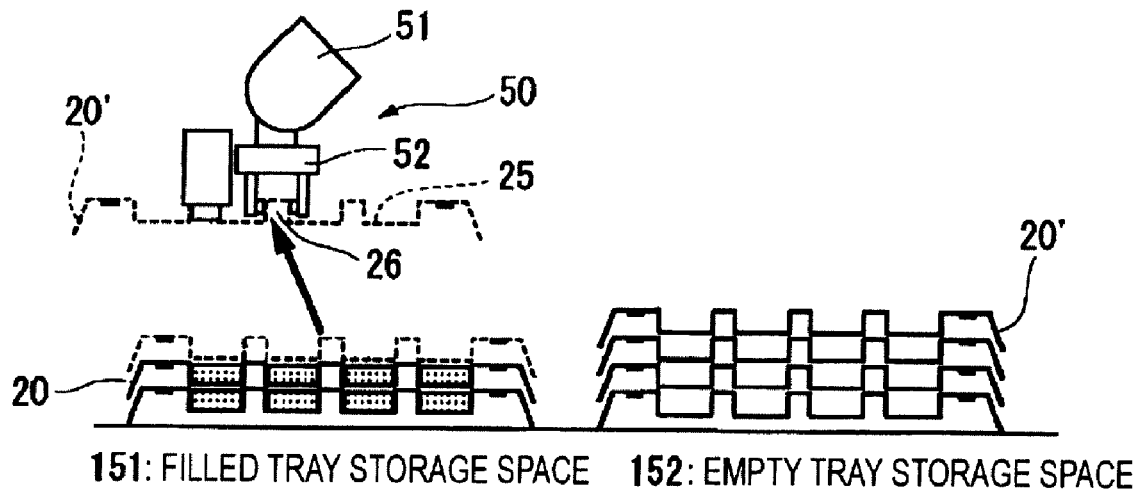
FIG. 21A is a descriptive view showing a process for gripping the empty tray.
Figure 21B:
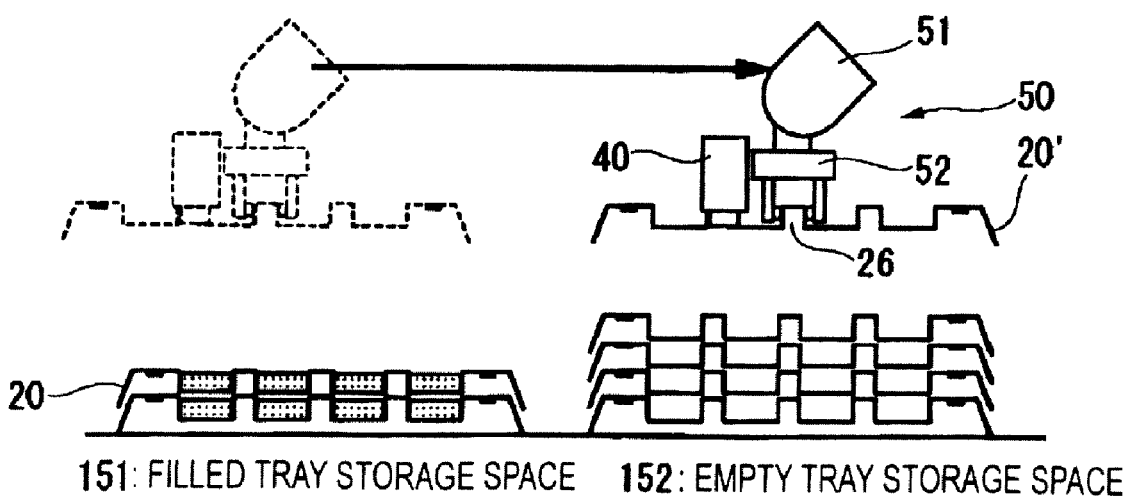
FIG. 21B is a descriptive view showing a process of shifting the empty tray to an empty tray storage space.

Consequently, the controller recognizes the layout information about the position and the attitude of the empty tray and commands the robot hand 52 to perform operation for recovering an empty tray. A grip portion 26 located between the workpiece housing indentations 25 of the empty tray 20' is gripped by means of the robot hand 52 (see FIG. 21A), and the thus-gripped empty tray 20' is moved to the empty tray storage space 152 (see FIG. 21B).

Figure 22A:
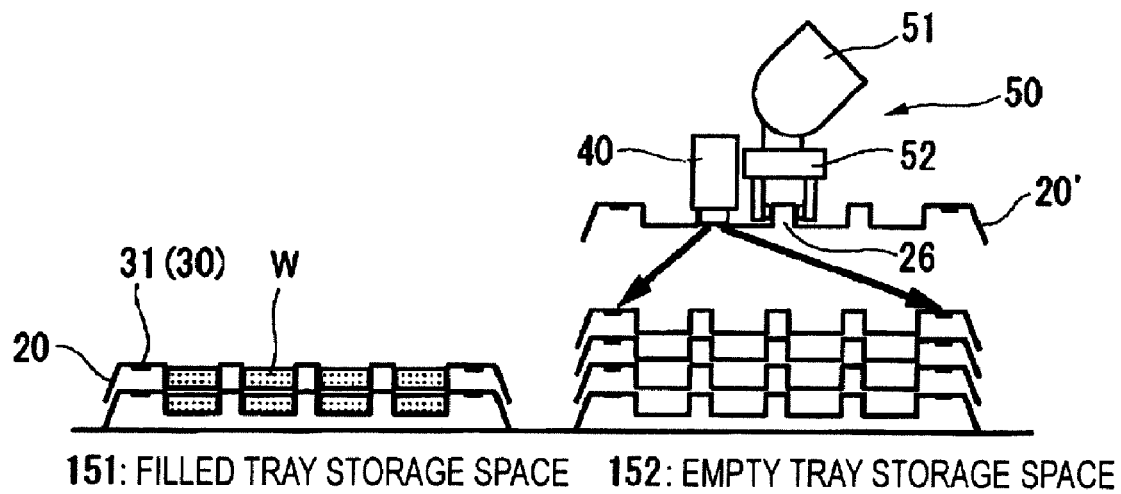
FIG. 22A is a descriptive view showing a process of arranging and measuring the empty tray storage space.

Next, the controller measures the pattern marker 30 of the topmost empty tray 20' already recovered and piled in the empty tray storage space 152 (see FIG. 22A), thereby recognizing layout information about the position and the attitude of the empty tray 20'.

Figure 22B:
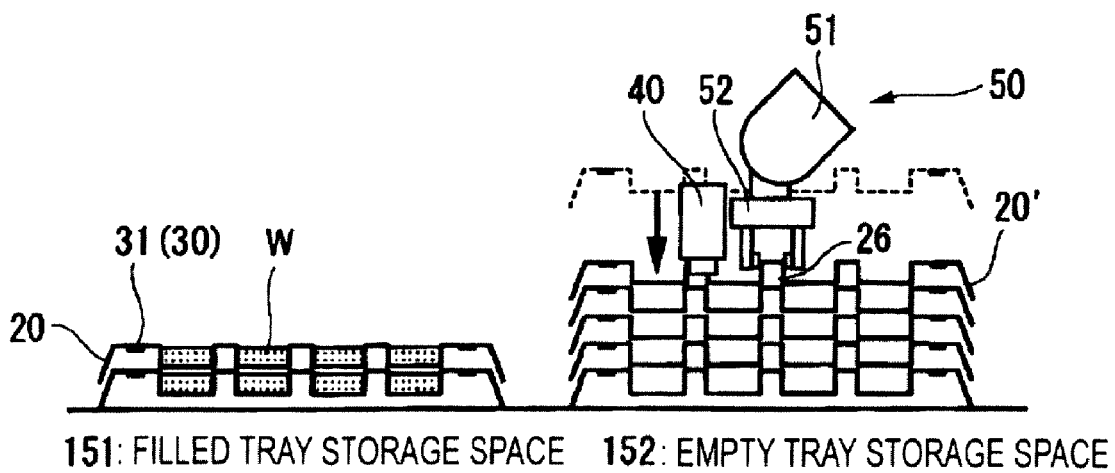
FIG. 22B is a descriptive view showing a process of piling up empty trays.

In this state, the controller controls motion of the robot hand 52 according to the layout information about the empty tray storage space 152, thereby accurately piling the empty tray 20' moved to the empty tray storage space 152 on the already-existing empty tray 20' (see FIG. 22B).

As mentioned above, in the present exemplary embodiment, layout information about the position and the attitude of the sorting tray 20 is recognized. A necessity for the positioning mechanism, the mechanism for recovering an empty tray, and the like, become obviated, and processing for recovering the empty tray 20' may be implemented, so long as merely the tray rest 150 is prepared.

—Apparatus of a Comparative Configuration for taking a Workpiece out of the Sorting Tray—

Figure 23A:
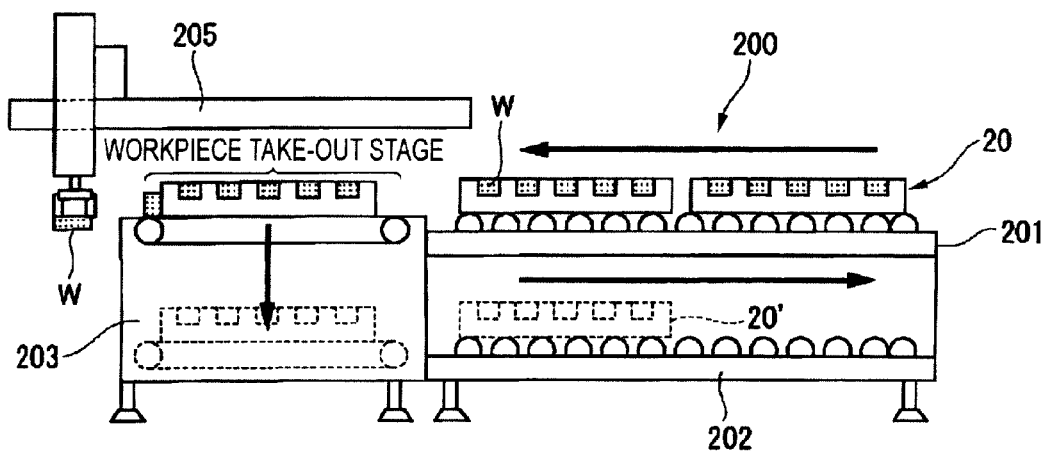
FIG. 23A is a descriptive view showing an apparatus for taking a workpiece out of the sorting tray of a comparative form.
Figure 23B:
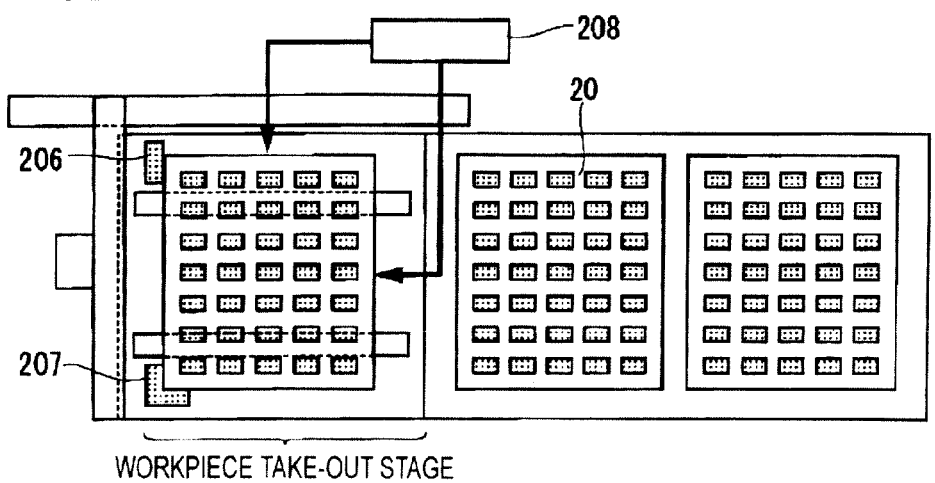
FIG. 23B is a planar descriptive view showing a processing stage.

On the contrary, a workpiece take-out apparatus 200 of a comparative configuration shown in FIG. 23 using a sorting tray includes the followings: namely, an filled tray conveyance conveyor 201 that conveys the filled tray 20; an empty tray conveyance conveyor 202 that conveys the empty tray 20'; an elevation table 203 that feeds the filled tray 20 conveyed by the filled tray conveyance conveyor 201 to a workpiece take-out stage and that goes up and down so as to recover the empty tray 20' into the empty tray conveyance conveyor 202; and a take-out robot 205 that takes a workpiece out of the filled tray 20 on the workpiece take-out stage.

In the exemplary embodiment, in order to perform positioning of the filled tray 20 on the workpiece take-out stage with high accuracy, there is apprehension of a necessity for a positioning mechanism 208 that presses from two directions the filled tray 20 against positioning reference members 206 and 207 that perform positioning in two directions as well as an inevitable necessity for the elevation table 203 for recovering the empty tray 20' and the empty tray conveyance conveyor 202. There is a concern about corresponding complication of facilities.

Moreover, provided that the filled tray 20 is roughly positioned, there arises apprehension of complication of a facility structure, like providing the take-out robot 205 with a high precision positioning mechanism and again gripping the workpiece W after the filled tray 20 has temporarily been set on a positioning jig.

Fifth Exemplary Embodiment

Figure 24:
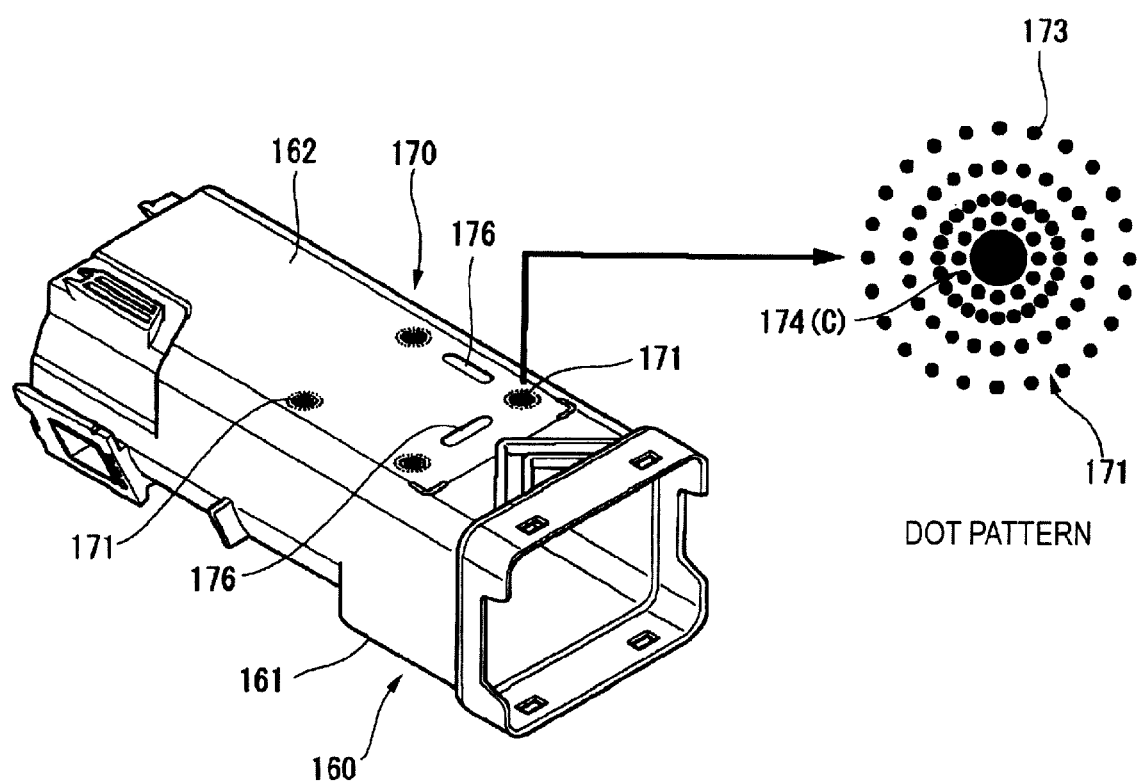
FIG. 24 is a descriptive view showing a structure for recognizing a toner cartridge as an example article to be collected of a fifth exemplary embodiment.
Figure 25:
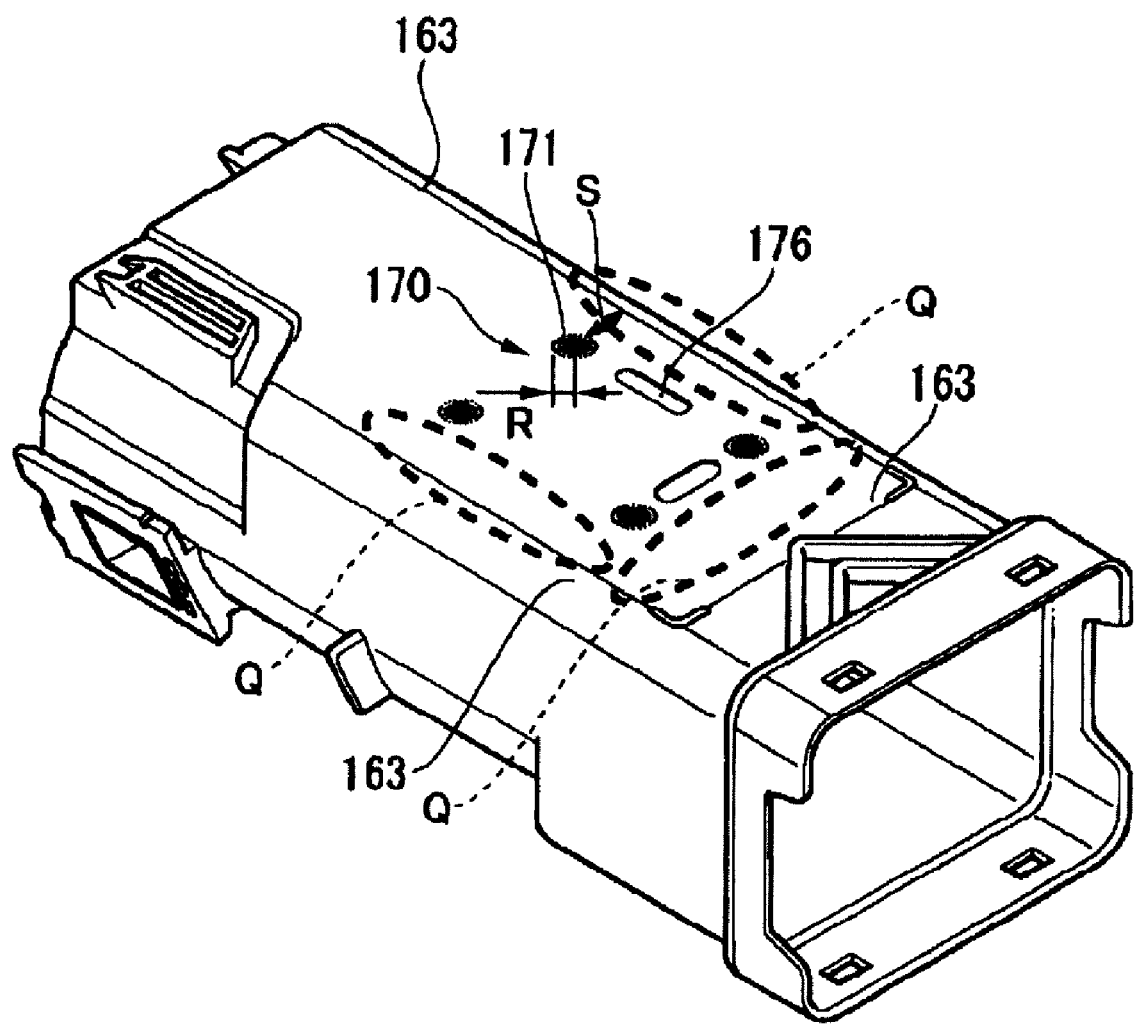
FIG. 25 is a descriptive view showing a preferred structure for recognizing the toner cartridge shown in FIG. 24.

FIG. 24 shows a structure for recognizing a collection target article of a fifth exemplary embodiment.

In the drawing, there is mentioned a toner cartridge 160 for feeding; for instance, toner used in an electrophotographic imaging apparatus, as a collection target article.

The toner cartridge 160 has a toner container 160 housing toner, and a pattern marker 170 is added to one side surface 162 of the toner container 161.

In the exemplary embodiment, the pattern marker 170 is provided with unit pattern marks 171 that are provided at four locations corresponding to apexes of a square area U in a portion of the one side surface 162 of the toner container 161. Further, type indication marks 176 are provided along two sides of the square area U.

Although the unit pattern marks 171 and the type indication marks 176 may also be additionally attached to a label or a card, the marks are formed as inscribed surface patterns for die molding in the present exemplary embodiment. For instance, like a corner cube (a tool that reflects light, or the like, to its original direction by utilization of a property of a corner of a cubical inner surface), required function blocks are directly inscribed on the toner container 161 by utilization of retroreflection. In particular, the unit pattern mark 171 is formed from a dot pattern in which a size and layout relationship of dots 173 is changed, so as to have a density distribution that exhibits a high density area 174 at the center position C and that gradually decreases with an increasing distance toward a periphery of the pattern. Further, the type indication mark 176 is provided for classifying a color and type of toner and formed from; for instance, a barcode or a code.

So long as such a pattern marker 170 is added to the toner cartridge 160, layout information about the position and the attitude of the toner cartridge 160 may be recognized. Therefore, a system that automatically attaches the toner cartridge 160 by means of a robot may readily be constructed.

In the configuration in which the pattern marker 170 is provided on the one side surface 162 of the toner container 161, it is desirable for the unit pattern marks 171 to assure a spatial area Q of certain size so as to exit between the unit pattern marks 171 and a periphery of the side surface 162 of the toner container 161 or a step 163 like a tapered portion. This is attributable to an algorithm for detecting the center position C of the unit pattern mark 171 with high accuracy and is intended for fulfilling a relationship of S>2R such that the rectangular detection window to be superposed on a circular pattern of the unit pattern mark 171 does not overlap the step 163. As a matter of course, a layout of the unit pattern mark 171 may arbitrarily be set, so long as a different detection algorithm is used for the pattern marker 170.

The location on the toner cartridge 160 where the pattern marker 170 is to be formed does not need to be the one side surface 162 of the toner container 161. For instance, the pattern marker 170 may also be provided on one end 164 of the toner container 161 as shown in FIG. 26B. In this case, even when the plurality of toner cartridges 160 are sorted and housed into a sorted container box 190 in a production line, or the like, as shown in FIG. 26A, layout information about the positions and attitudes of the toner cartridges 160 housed in the sorted container box 190 may accurately be recognized.

Sixth Exemplary Embodiment

FIG. 27 shows a collection processing apparatus of a sixth exemplary embodiment.

In the drawing, the collection processing apparatus is substantially analogous to its counterpart described in connection with the first exemplary embodiment in terms of a basic structure. However, the collection processing apparatus of the present exemplary embodiment differs from its counterpart of the first exemplary embodiment in connection with a method for measuring the pattern marker 30 of the sorting tray 20 by means of the camera 40. Elements analogous to those described in connection with the first exemplary embodiment are assigned reference numerals analogous to those employed in the first exemplary embodiment, and their detailed explanations are omitted here for brevity.

Figure 27A:
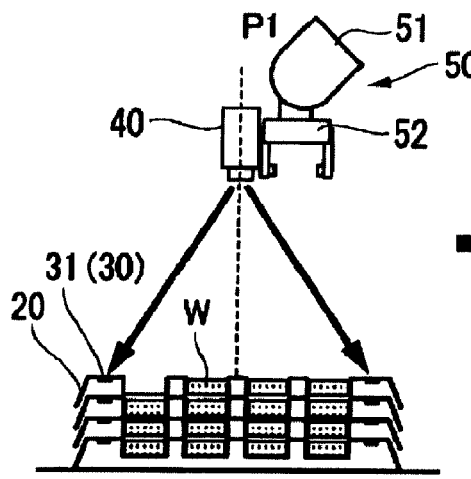
FIG. 27A is a descriptive view showing a process of measuring a position and an attitude of a first-stage sorting tray.

In short, in the present exemplary embodiment, a controller not included in the drawings first places the camera 40 at a home position of the robot that is a location on the first stage (a face-up measurement position P1 at which the center position C of the view field range of the camera 40 faces up to the center position C of the pattern marker 30 of the sorting tray 20 in the exemplary embodiment); and measures the pattern marker 30 of the sorting tray 20 with rough accuracy (see FIG. 27A).

Figure 27B:
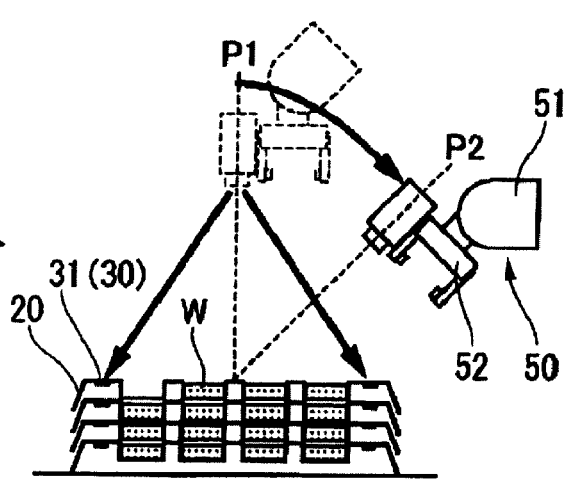
FIG. 27B is a descriptive view showing a process of shifting a camera to a position where high accuracy measurement is possible.

Next, the controller rotationally moves the robot hand 52, thereby shifting the camera 40 to a position where highly accurate measurement is possible and that is on the second stage (e.g., a non-face-up measurement position P2 tilted at an angle θ (e.g., 45°) with respect to the face-up measurement position) (see FIG. 27B).

Figure 27C:
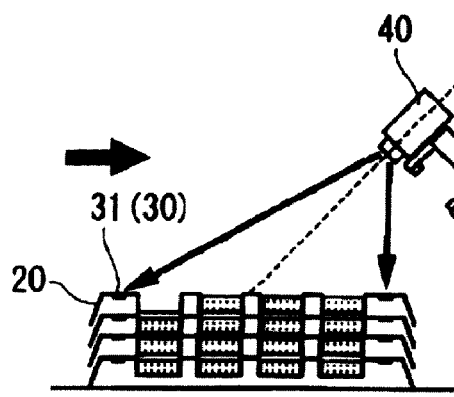
FIG. 27C is a descriptive view showing a process of measuring a position and an attitude of a second-stage sorting tray.
Figure 27D:
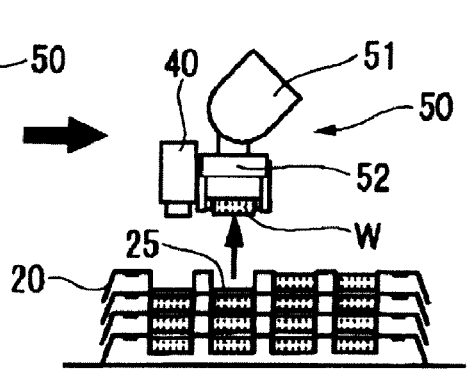
FIG. 27D is a descriptive view showing a process of gripping a workpiece in the sorting tray.

In this state, the pattern marker 30 of the sorting tray 20 is measured with high accuracy (see FIG. 27C). Layout information about the position and the attitude of the sorting tray 20 is recognized with high accuracy according to the rough measurement information about the pattern marker 30 of the sorting tray 20 on the first stage and highly accurate measurement information about the pattern marker 30 of the sorting tray 20 on the second stage. Layout information about the position and the attitude of the workpiece W in the sorting tray 20 is accurately determined and recognized.

Subsequently, the controller performs processing for collecting the workpiece W of the sorting tray 20 by means of the robot hand.

In the present exemplary embodiment, two-stage measurement is performed while the face-up measurement position P1 is taken as the first measurement position and the non-face-up measurement position P2 is taken as the second measurement position. However, the present invention is not limited to the measurement positions. For instance, the non-face-up measurement position P2 may also be selected as the first measurement position, or plural of measurement operations including measurement operation of three stages or more may also be performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A structure for recognizing an article to be collected, wherein the structure is recognized by capturing a position and an attitude of the article to be recognized by an imaging tool, comprising:
   a recognition indicator plane that is included in the article to be recognized and that has four or more unit pattern marks at a predetermined positional relationship, in which each of the unit pattern marks is formed such that a density pattern sequentially changes with an increasing distance from a center position toward a periphery of the mark; and
   a recognition indicator element indicates a change in density pattern of each of the unit pattern marks in the form of a dot image,
   wherein the position and the attitude of the article to be recognized are recognized by capturing the recognition indicator plane by the imaging tool.

2. The structure for recognizing an article to be collected according to claim 1, wherein the recognition indicator element has four unit pattern marks provided on a single plane of the holding base or the article to be recognized made up of an article to be collected.

3. The structure for recognizing an article to be collected according to claim 1, wherein the recognition indicator element is provided on a card that is removably attached to the holding base or the article to be recognized made up of an article to be collected.

4. The structure of recognizing an article to be collected according to claim 1, wherein the recognition indicator element has the four unit pattern marks or more and type indication marks used for recognizing type information other than the layout information about the position and the attitude of the holding base or the article to be recognized made up of an article to be collected.

5. A structure for recognizing an article to be collected, comprising:
   a recognition reference plane that is provided in a portion of an article to be collected and that serves as a reference used for recognizing layout information about a position and an attitude of the article to be collected; and
   a recognition indicator element which is provided on the recognition reference plane in such a way that the imaging tool captures an image of the recognition indicator element and which has four or more unit pattern marks with a predetermined position relationship, each of which is formed such that the density pattern sequentially changes with an increasing distance from the center position toward the periphery of the mark,
   wherein the recognition indicator element indicates a change in density pattern of each of the unit pattern marks in the form of a dot image.

6. The structure for recognizing an article to be collected according to claim 5, wherein the recognition indicator element has four unit pattern marks provided on a single plane of the holding base or the article to be recognized made up of an article to be collected.

7. The structure for recognizing an article to be collected according to claim 5, wherein the recognition indicator element is provided on a card that is removably attached to the holding base or the article to be recognized made up of an article to be collected.

8. The structure of recognizing an article to be collected according to claim 5, wherein the recognition indicator element has the four unit pattern marks or more and type indication marks used for recognizing type information other than the layout information about the position and the attitude of the holding base or the article to be recognized made up of an article to be collected.

9. A collection information recognition apparatus comprising:
   a recognition indicator element that is provided in a portion of the holding base for holding the article to be collected with a predetermined positional relationship or a portion of the
   article to be collected and that has four unit pattern marks or more, with a predetermined positional relationship, formed in such a way that the density pattern sequentially changes with an increasing distance from the center position toward the periphery of the mark;
   an imaging tool that captures an image of the recognition indicator element placed opposite the holding base or the article to be collected; and
   a layout information recognition block that recognizes layout information about the position and the attitude of the holding base or the article to be recognized made up of an article to be collected, by use of at least imaging information about the recognition indicator element whose image has been captured by the imaging tool,
   wherein the recognition indicator element indicates a change in density pattern of each of the unit pattern marks in the form of a dot image.

10. A collection processing apparatus comprising:
    a collection information recognition apparatus according to claim 9;
    a control block that generates a control signal from layout information, recognized by the collection information recognition apparatus, about a position and an attitude of a holding base or a position and an attitude of an article to be recognized made up of an article to be collected and controls collection processing operation for the article to be collected; and a processing mechanism that performs operation for collecting the article to be collected according to a control signal generated by the control block.

11. The collection processing apparatus according to claim 10, wherein the processing mechanism doubles also as an imaging tool support mechanism.

* * * * *